US009134601B2

United States Patent
Segawa

(10) Patent No.: US 9,134,601 B2
(45) Date of Patent: Sep. 15, 2015

(54) 3D IMAGE DISPLAY OPTICAL MEMBER AND 3D IMAGE DISPLAY DEVICE

(75) Inventor: Masaru Segawa, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 334 days.

(21) Appl. No.: 13/639,429

(22) PCT Filed: Apr. 4, 2011

(86) PCT No.: PCT/JP2011/058556
§ 371 (c)(1),
(2), (4) Date: Oct. 4, 2012

(87) PCT Pub. No.: WO2011/125986
PCT Pub. Date: Oct. 13, 2011

(65) Prior Publication Data
US 2013/0027773 A1    Jan. 31, 2013

(30) Foreign Application Priority Data
Apr. 6, 2010    (JP) ................. P2010-087545

(51) Int. Cl.
*G02B 27/26*    (2006.01)
*G02B 27/22*    (2006.01)
*G03B 35/26*    (2006.01)
*H04N 13/04*    (2006.01)

(52) U.S. Cl.
CPC ............. *G03B 35/26* (2013.01); *G02B 27/26* (2013.01); *H04N 13/0422* (2013.01); *H04N 13/0434* (2013.01)

(58) Field of Classification Search
USPC ........... 345/4, 5, 6; 348/46, 51, 54–60; 349/9, 349/15, 110, 181; 359/464, 465, 466
See application file for complete search history.

(56) References Cited

U.S. PATENT DOCUMENTS

| | | | |
|---|---|---|---|
| 5,831,701 A * | 11/1998 | Matsuyama et al. | 349/110 |
| 6,717,728 B2 * | 4/2004 | Putilin | 359/462 |
| 8,044,879 B2 * | 10/2011 | Matveev et al. | 345/4 |
| 2003/0107686 A1 | 6/2003 | Sato et al. | |

(Continued)

FOREIGN PATENT DOCUMENTS

| | | |
|---|---|---|
| EP | 2000843 A2 | 12/2008 |
| JP | 9-090431 A | 4/1997 |

(Continued)

OTHER PUBLICATIONS

Office Action Cited in Chinese Application No. 201180016564.9 dated Mar. 28, 2014, eight (8) pages.

(Continued)

*Primary Examiner* — Jade R Chwasz
(74) *Attorney, Agent, or Firm* — Nath, Goldberg & Meyer; Jerald L. Meyer; Stanley N. Protigal

(57) ABSTRACT

A polarizing-axis control plate includes first and second polarization areas and a polarizing-axis control plate area shading part arranged at a boundary between these polarization areas and arranged in a position corresponding to an image generating area shading part to shade all or part of right-eye and left-eye image lights. When these image lights enter the first and second polarization areas respectively, the polarizing-axis control plate emits these image lights in the form of linearly-polarized lights whose polarizing axes intersect with each other at right angles or circularly-polarized lights whose polarizing axes are rotated in opposite directions. The image generating area shading part is arranged at a boundary between first and second modulated-light generating areas to shade incident light. The polarizing-axis control plate area shading part is formed to contain a plurality of straight lines each having a width narrower than a linewidth of the image generating area shading part.

5 Claims, 19 Drawing Sheets

(56) References Cited

U.S. PATENT DOCUMENTS

| | | | |
|---|---|---|---|
| 2007/0165304 A1 | 7/2007 | Tomita | |
| 2008/0239483 A1* | 10/2008 | Kuroda et al. | 359/465 |
| 2008/0239485 A1* | 10/2008 | Kuroda et al. | 359/485 |
| 2008/0297897 A1* | 12/2008 | Oyamada et al. | 359/465 |
| 2008/0304151 A1* | 12/2008 | Ura | 359/466 |

FOREIGN PATENT DOCUMENTS

| | | | | |
|---|---|---|---|---|
| JP | 10-232365 A | | 9/1998 | |
| JP | 2002-185983 A | | 6/2002 | |
| JP | 2004-264338 A | | 9/2004 | |
| JP | 2002-185983 | * | 6/2008 | H04N 13/04 |
| JP | 2008-304909 A | | 12/2008 | |
| KR | 20100104266 A | | 9/2010 | |

OTHER PUBLICATIONS

European Search Report in the Counterpart Application No. 11765886.4, dated Sep. 12, 2013, seven (7) pages.

Office Action issued in the Korean Counterpart Application, issued on Oct. 22, 2013, four (4) pages.

\* cited by examiner

FIG. 10

| No. | SPECIFICATIONS P=270 μm | MOIRE (OBSERVING POSITION H630) | | | | LIGHT TRANS- MISSION RATE (%) | SYN- THETIC JUDG- MENT |
|---|---|---|---|---|---|---|---|
| | | FRONT | OB- LIQUE | VER- TICAL MOIRE | TOTAL | | |
| COMPARATIVE EXAMPLE | STANDARD | 5 | 5 | 0 | 10 | 45 | × |
| EXPERIMENTAL EXAMPLE 1-1 | SMALL CIRCLE BS | 2 | 2 | 0 | 4 | 58 | ○ |
| EXPERIMENTAL EXAMPLE 1-2 | SQUARE DOT | 2 | 3 | 5 | 10 | 58 | × |
| EXPERIMENTAL EXAMPLE 1-3 | BS DUAL- PARTITIONING | 4 | 4 | 0 | 8 | 57 | × |
| EXPERIMENTAL EXAMPLE 1-4 | BS TRIPLE- PARTITIONING | 2.5 | 1 | 0 | 3.5 | 56 | ○ |
| EXPERIMENTAL EXAMPLE 2-1 | CIRCULAR OBLIQUE LINE | 2 | 1 | 2 | 5 | 57 | ○ |
| EXPERIMENTAL EXAMPLE 2-2 | ELLIPSE 3 PICS. LINE | 5 | 4 | 4 | 13 | 55 | × × |
| EXPERIMENTAL EXAMPLE 2-3 | ANGULAR OBLIQUE LINE | 2.5 | 2 | 2 | 6.5 | 56 | △ |
| EXPERIMENTAL EXAMPLE 2-4 | MOUSE-SHAPED ARRAY | 2.5 | 2 | 2 | 6.5 | 58 | △ |
| EXPERIMENTAL EXAMPLE 2-5 | SMALL CIRCLE + LINE | 2 | 1 | 0 | 3 | 55 | ◎ |

FIG. 12

| No. | SPECIFICATIONS P=270 μm | MOIRE (OBSERVING POSITION H630) | | | | LIGHT TRANS-MISSION RATE (%) | SYN-THETIC JUDG-MENT |
|---|---|---|---|---|---|---|---|
| | | FRONT | OB-LIQUE | VER-TICAL MOIRE | TOTAL | | |
| COMPARATIVE EXAMPLE | STANDARD | 5 | 5 | 0 | 10 | 45 | × |
| EXPERIMENTAL EXAMPLE 1-1 | SMALL CIRCLE BS φ50 μm | 2 | 2 | 0 | 4 | 58 | ○ |
| EXPERIMENTAL EXAMPLE 3-2 | MIDDLE CIRCLE BS φ60 μm | 2 | 3 | 2 | 7 | 57 | △ |
| EXPERIMENTAL EXAMPLE 3-3 | LARGE CIRCLE BS φ70 μm | 4 | 4 | 0 | 8 | 49 | × |
| EXPERIMENTAL EXAMPLE 2-5 | SMALL CIRCLE BS φ50 μm CENTRAL LINE W=50 μm, TOTAL WIDTH =130 μm | 2 | 1 | 0 | 3 | 55 | ◎ |
| EXPERIMENTAL EXAMPLE 1-3 | 2-LINES PARTITION | 4 | 4 | 0 | 8 | 57 | × |
| EXPERIMENTAL EXAMPLE 1-4 | 3-LINES PARTITION | 2.5 | 1 | 0 | 3.5 | 56 | ○ |
| EXPERIMENTAL EXAMPLE 4-3 | 3-LINES PARTITION | 3 | 1 | 0 | 4 | 57 | ○ |
| EXPERIMENTAL EXAMPLE 4-4 | 5-LINES PARTITION | 2 | 1 | 0 | 3 | 52 | ◎ |
| EXPERIMENTAL EXAMPLE 4-5 | 7-LINES PARTITION | 1 | 1 | 0 | 2 | 47 | ◎ |

FIG. 14

| No. | SPECIFICATIONS P=270μm | MOIRE (OBSERVING POSITION H630) | | | | LIGHT TRANS- MISSION RATE (%) | SYN- THETIC JUDG- MENT |
|---|---|---|---|---|---|---|---|
| | | FRONT | OB- LIQUE | VER- TICAL MOIRE | TOTAL | | |
| COMPARATIVE EXAMPLE | STANDARD | 5 | 5 | 0 | 10 | 45 | × |
| EXPERIMENTAL EXAMPLE 4-3 | 3-LINES PARTITION | 3 | 2 | 0 | 5 | 57 | ○ |
| EXPERIMENTAL EXAMPLE 5-2 | MICRO-CIRCLE + LINE CENTRAL LINE W=50μm | 1.5 | 1 | 0 | 2.5 | 63 | ◎ |
| EXPERIMENTAL EXAMPLE 2-5 | SMALL CIRCLE + LINE CENTRAL LINE W=50μm | 2 | 1 | 0 | 3 | 55 | ◎ |
| EXPERIMENTAL EXAMPLE 5-4 | SMALL SQUARE BLANKING | 4 | 4 | 2 | 10 | 52 | × |
| EXPERIMENTAL EXAMPLE 1-1 | SMALL CIRCLE BS | 2 | 2 | 0 | 4 | 58 | ○ |
| EXPERIMENTAL EXAMPLE 5-6 | SMALL SQUARE RANDOM BLANKING | 3 | 4 | 5 | 12 | 55 | × × |

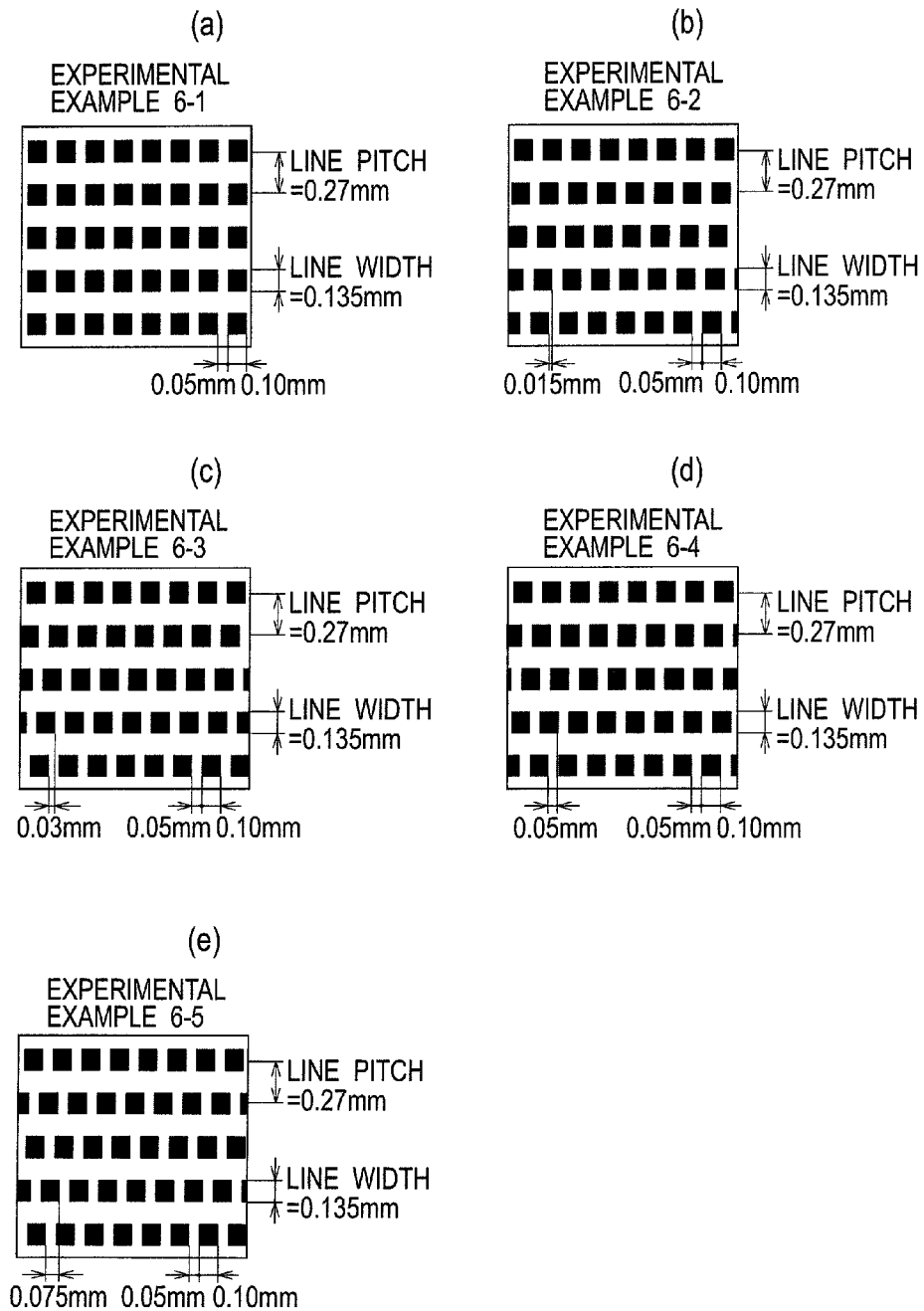

FIG. 16

| No. | SPECIFICATIONS P=270 μm | MOIRE (OBSERVING POSITION H630) | | | | LIGHT TRANS- MISSION RATE (%) | SYN- THETIC JUDG- MENT |
|---|---|---|---|---|---|---|---|
| | | FRONT | OB- LIQUE | VER- TICAL MOIRE | TOTAL | | |
| COMPARATIVE EXAMPLE | STANDARD | 5 | 5 | 0 | 10 | 45 | × |
| EXPERIMENTAL EXAMPLE 6-1 | SQUARE DOT SHIFT : 0 μm | 2 | 3 | 5 | 10 | 60 | × |
| EXPERIMENTAL EXAMPLE 6-2 | SQUARE DOT SHIFT : 15 μm | 2 | 4 | 4 | 10 | 60 | × |
| EXPERIMENTAL EXAMPLE 6-3 | SQUARE DOT SHIFT : 30 μm | 2 | 3 | 3 | 8 | 60 | × |
| EXPERIMENTAL EXAMPLE 6-4 | SQUARE DOT SHIFT : 50 μm | 2 | 1 | 1 | 4 | 60 | ○ |
| EXPERIMENTAL EXAMPLE 6-5 | SQUARE DOT SHIFT : 75 μm | 2 | 1 | 1 | 4 | 58 | ○ |

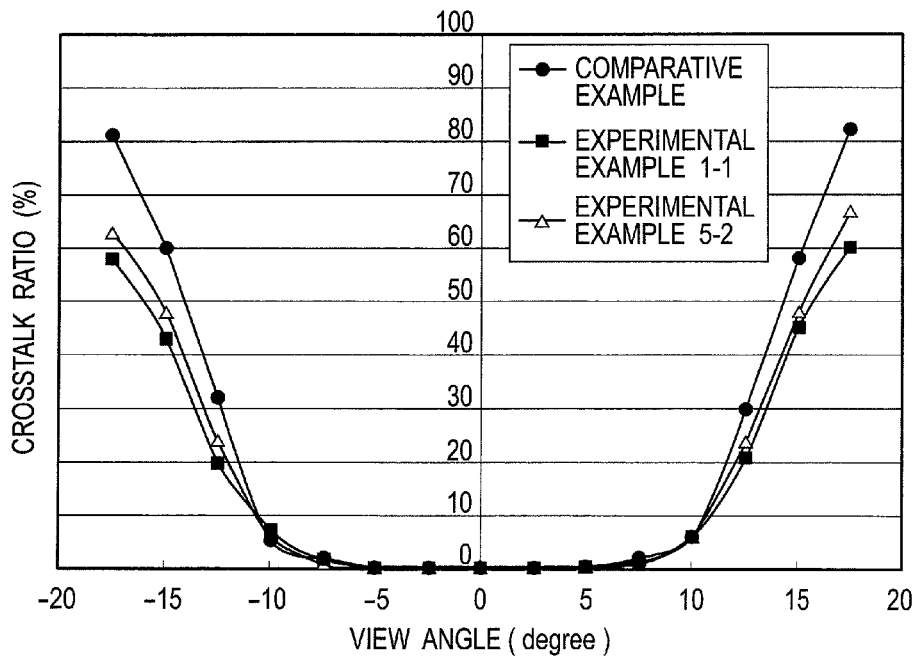

FIG. 17

FIG. 23
(A) 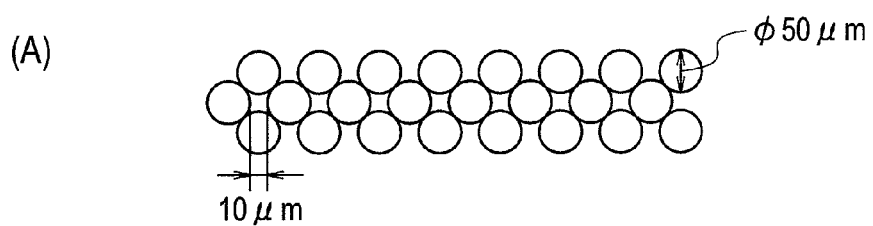
(B) 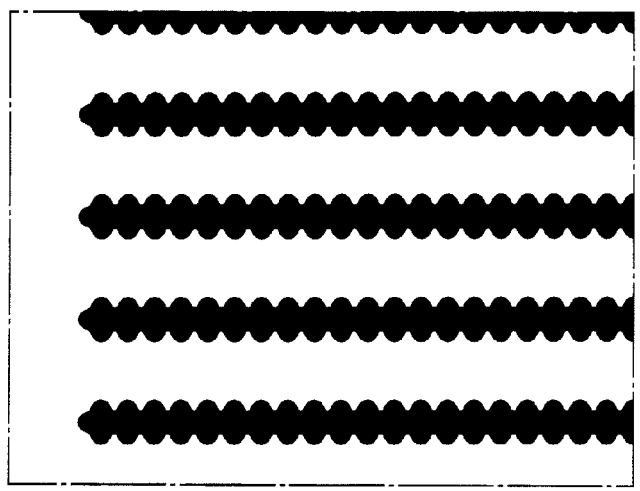

Title: 3D IMAGE DISPLAY OPTICAL MEMBER AND 3D IMAGE DISPLAY DEVICE

3D IMAGE DISPLAY OPTICAL MEMBER AND 3D IMAGE DISPLAY DEVICE

This is a National Phase Application filed under 35 U.S.C. §371 as a national stage of International Application No. PCT/JP2011/058556, filed Apr. 4, 2011, claiming the benefit from Japanese Patent Application No. P2010-087545, filed Apr. 6, 2010, the entire content of each of which is hereby incorporated by reference in its entirety.

TECHNICAL FIELD

The present invention relates to a 3D image display optical member and a 3D image display device.

BACKGROUND ARTS

For a device that allows an observer to recognize a stereoscopic image, there is known a 3D image display device including an image generating unit for displaying an image for left eye and an image for right eye on different areas and a polarizing-axis control plate that emits linearly-polarized lights whose polarizing axes of polarized lights incident on two different areas intersect with each other at right angles or circularly-polarized lights whose polarizing axes are rotated in opposite directions (see Patent Documents 1 to 5).

PRIOR ART DOCUMENTS

Patent Documents

Patent Document 1: Japanese Patent Publication Laid-open No. H10-232365
Patent Document 2: Japanese Patent Publication Laid-open No. 2004-264338
Patent Document 3: Japanese Patent Publication Laid-open No. H09-90431
Patent Document 4: Japanese Patent Publication Laid-open No. 2008-304909
Patent Document 5: Japanese Patent Publication Laid-open No. 2002-185983

SUMMARY OF THE INVENTION

Problems to be Solved

However, moiré was sometimes generated in case of adopting the techniques described in Patent Documents 1 to 5. The "moiré" is also called "interference fringes" and means a striped pattern that is visually produced under condition of superimposing multiple repetitive regular patterns, due to shifts in cycle among these patterns.

In common with Patent Documents 4 and 5, for instance, a 3D image display device includes: an image generating unit having an area for generating an image for right eye, an area for generating an image for left eye, pixels with red color filters, pixels with green color filters, pixels with blue color filters and image generating area shading parts provided with black matrixes as lattice-like black patterns among respective color filter areas to prevent color mixing among adjacent red, green and blue pixels and also shade light from a back light thereby improving contrast of an image; and a polarizing-axis control plate having first polarization areas for transmitting the image for right eye, second polarization areas for transmitting the image for left eye after rotating it at a right angle to the polarizing axis and polarizing-axis control plate area shading parts for reducing the occurrence of crosstalk. In this device, as the pitches of the image generating area shading parts and the polarizing-axis control plate area shading parts are close to each other, moiré is generated with ease. In general, if two repetitive regular patterns are parallel to each other, then the interval (cycle) "d" of moiré on generation is represented by an expression of "$d=p^2/\delta p$" on condition of representing the interval (cycle) of a first pattern by "p" and the interval (cycle) of a second pattern by "$p+\delta p$" (on the relationship of $0<\delta p<p$).

Between the image generating area shading parts and the polarizing-axis control plate area shading parts, a glass substrate is arranged to retain the polarizing-axis control plate. These shading parts are separated from each other at a constant distance by this glass substrate. Therefore, from an observer in front of the display, the image generating area shading parts and the polarizing-axis control plate area shading parts appear to overlap each other and do not appear to be separated from each other. Therefore, no moiré is produced. However, if the observer observes a device's area far from the front area, the image generating area shading parts and the polarizing-axis control plate area shading parts appear as if they were separated from each other. That is, moiré is observed since a shift is produced between the pitches in appearance.

Under the above-mentioned problem, an object of the present invention is to provide a 3D image display optical member and a 3D image display device both of which can reduce the occurrence of moiré.

Solutions to the Problems

In order to attain the above-mentioned object, the first feature of a 3D image display optical member of the present invention resides in that it comprises: an image generating unit having a first modulated-light generating area to optically modulate linearly-polarized light having a first polarizing axis with a predetermined angle based on a first image signal thereby generating first modulation-polarization light for emission and a second modulated-light generating area to optically modulate the linearly-polarized light having the first polarizing axis based on a second image signal thereby generating second modulation-polarization light for emission; a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and a polarizing-axis control plate having a first polarization area arranged corresponding to the position of the first modulated-light generating area in the image generating unit to polarize a polarizing axis of the first modulation-polarization light, which has been emitted from the polarizing plate and entered the first polarization area, to a third polarizing axis thereby generating a third modulation-polarization light for emission, a second polarization area arranged corresponding to the position of the second modulated-light generating area in the image generating unit to polarize a polarizing axis of the second modulation-polarization light, which has been emitted from the polarizing plate and entered the second polarization area, to a fourth polarizing axis thereby generating a fourth modulation-polarization light for emission, and a shading part arranged at a boundary between the first polarization area and the second polarization area to shade incident light, wherein the image generating unit has an image generating area shading part arranged at a boundary between the first modulated-light generating area and the second modulated-light generating area to shade incident light, and the shading part is formed so as to contain a plurality of straight lines each having a width smaller than a linewidth of the image generating area shading part.

In order to attain the above-mentioned object, the second feature of a 3D image display optical member of the present invention resides in that it comprises: an image generating unit having first modulated-light generating areas to optically modulate linearly-polarized light having a first polarizing axis with a predetermined angle based on a first image signal thereby generating first modulation-polarization light for emission and second modulated-light generating areas to optically modulate the linearly-polarized light having the first polarizing axis based on a second image signal thereby generating second modulation-polarization light for emission; a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and a polarizing-axis control plate having first polarization areas arranged corresponding to the positions of the first modulated-light generating areas in the image generating unit to polarize a polarizing axis of the first modulation-polarization light, which has been emitted from the polarizing plate and entered the first polarization areas, to a third polarizing axis thereby generating a third modulation-polarization light for emission, second polarization areas arranged corresponding to the position of the second modulated-light generating area in the image generating unit to polarize a polarizing axis of the second modulation-polarization light, which has been emitted from the polarizing plate and entered the second polarization areas, to a fourth polarizing axis thereby generating a fourth modulation-polarization light for emission, and shading parts each arranged at a boundary between the first polarization area and the second polarization area to shade incident light, wherein the image generating unit has image generating area shading parts each arranged at a boundary between the first modulated-light generating area and the second modulated-light generating area to shade incident light and interpixel shading parts each arranged at a boundary between pixels provided in each of the first modulated-light generating areas and the second modulated-light generating areas to shade incident light, the shading part is formed so as to contain at least one straight line having a width smaller than an interval between the adjoining image generating area shading parts or an interval between the adjoining interpixel shading parts and a plurality of circles arranged on the side of the boundary along the straight line, the circles each having a diameter smaller than either the interval between the adjoining image generating area shading parts or the interval between the adjoining interpixel shading parts.

In order to attain the above-mentioned object, the third feature of a 3D image display optical member of the present invention resides in that it comprises an image generating unit having first modulated-light generating areas to optically modulate linearly-polarized light having a first polarizing axis with a predetermined angle based on a first image signal thereby generating first modulation-polarization light for emission and second modulated-light generating areas to optically modulate the linearly-polarized light having the first polarizing axis based on a second image signal thereby generating second modulation-polarization light for emission; a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and a polarizing-axis control plate having first polarization areas arranged corresponding to the positions of the first modulated-light generating areas in the image generating unit to polarize a polarizing axis of the first modulation-polarization light, which has been emitted from the polarizing plate and entered the first polarization areas, to a third polarizing axis thereby generating a third modulation-polarization light for emission, second polarization areas arranged corresponding to the position of the second modulated-light generating area in the image generating unit to polarize a polarizing axis of the second modulation-polarization light, which has been emitted from the polarizing plate and entered the second polarization areas, to a fourth polarizing axis thereby generating a fourth modulation-polarization light for emission, and shading parts each arranged at a boundary between the first polarization area and the second polarization area to shade incident light, wherein the image generating unit has image generating area shading parts each arranged at a boundary between the first modulated-light generating area and the second modulated-light generating area to shade incident light and interpixel shading parts each arranged at a boundary between pixels provided in each of the first modulated-light generating areas and the second modulated-light generating areas to shade incident light, the shading part is formed so as to contain a plurality of circles each having a diameter smaller than an interval between the adjoining image generating area shading parts or an interval between the adjoining interpixel shading parts.

In order to attain the above-mentioned object, the fourth feature of a 3D image display optical member of the present invention resides in that it comprises: an image generating unit having first modulated-light generating areas to optically modulate linearly-polarized light having a first polarizing axis with a predetermined angle based on a first image signal thereby generating first modulation-polarization light for emission and second modulated-light generating areas to optically modulate the linearly-polarized light having the first polarizing axis based on a second image signal thereby generating second modulation-polarization light for emission; a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and a polarizing-axis control plate having first polarization areas arranged corresponding to the positions of the first modulated-light generating areas in the image generating unit to polarize a polarizing axis of the first modulation-polarization light, which has been emitted from the polarizing plate and entered the first polarization areas, to a third polarizing axis thereby generating a third modulation-polarization light for emission, second polarization areas arranged corresponding to the positions of the second modulated-light generating areas in the image generating unit to polarize a polarizing axis of the second modulation-polarization light, which has been emitted from the polarizing plate and entered the second polarization areas, to a fourth polarizing axis thereby generating a fourth modulation-polarization light for emission, and shading parts each arranged at a boundary between the first polarization area and the second polarization area to shade incident light, wherein the image generating unit has image generating area shading parts each arranged at a boundary between the first modulated-light generating area and the second modulated-light generating area to shade incident light and interpixel shading parts each arranged at a boundary between pixels provided in each of the first modulated-light generating areas and the second modulated-light generating areas to shade incident light, the shading part includes a plurality of rectangles arranged along the boundary between the first polarization area and the second polarization area and also arranged so as to be shifted from rectangles in the shading part provided at the adjoining boundary, in the arranging direction of the rectangles by only ⅓ to ½ of a horizontal pitch at which the rectangles provided at the adjoining boundary are arranged.

In order to attain the above-mentioned object, the first feature of a 3D image display device of the present invention resides in that it comprises: a light source; a linearly-polarized light generating unit configured to transmit, of light emitted from the light source, first linearly-polarized light having the first polarizing axis; and the 3D image display optical member of any of the first to fourth features, wherein an image generated by the third modulation-polarization light emitted from the first polarization area of the polarizing-axis control plate is established as a right-eye image, while an image generated by the fourth modulation-polarization light emitted from the second polarization area is established as a left-eye image.

Effects of the Invention

According to the 3D image display optical member and the 3D image display device of the present invention, it is possible to reduce the visibility of moire.

BRIEF DESCRIPTION OF THE DRAWINGS

FIG. 10 is a diagram showing the results of evaluating moiré and light transmission rates about the comparative and experimental examples shown in FIGS. 8 and 9 in the 3D image display device of the embodiment 1 of the present invention.

FIG. 12 is a diagram showing the results of evaluating moiré and light transmission rates about the comparative example of FIG. 8(a) and the experimental example of FIG. 11 in the 3D image display device of the embodiment 1 of the present invention.

FIG. 14 is a diagram showing the results of evaluating moiré and light transmission rates about the comparative example of FIG. 8(a) and the experimental example of FIG. 13 in the 3D image display device of the embodiment 1 of the present invention.

FIGS. 15(a) to 15(e) are views showing experimental examples of the linear patterns of the polarizing-axis control plate shading parts in the 3D image display device of the embodiment 1 of the present invention.

FIG. 16 is a diagram showing the results of evaluating moiré and light transmission rates about the comparative example of FIG. 8(a) and the experimental example of FIG. 16 in the 3D image display device of the embodiment 1 of the present invention.

FIG. 17 is a diagram showing the result of a crosstalk ratio with respect to each view angle about a comparative example of FIG. 8(a), an experimental example 1-1 of FIG. 8(b) and an experimental example 5-2 of FIG. 13(a) in the 3D image display device of the embodiment 1 of the present invention.

FIG. 23(A) is an enlarged view of dots of FIG. 8(b) showing its design status, while FIG. 23(B) is an enlarged view of dots formed under the condition of FIG. 23(A) actually.

EMBODIMENTS OF THE INVENTION

Several embodiments of the present invention will be described below with reference to drawings.

<Embodiment 1>

Figure 1:
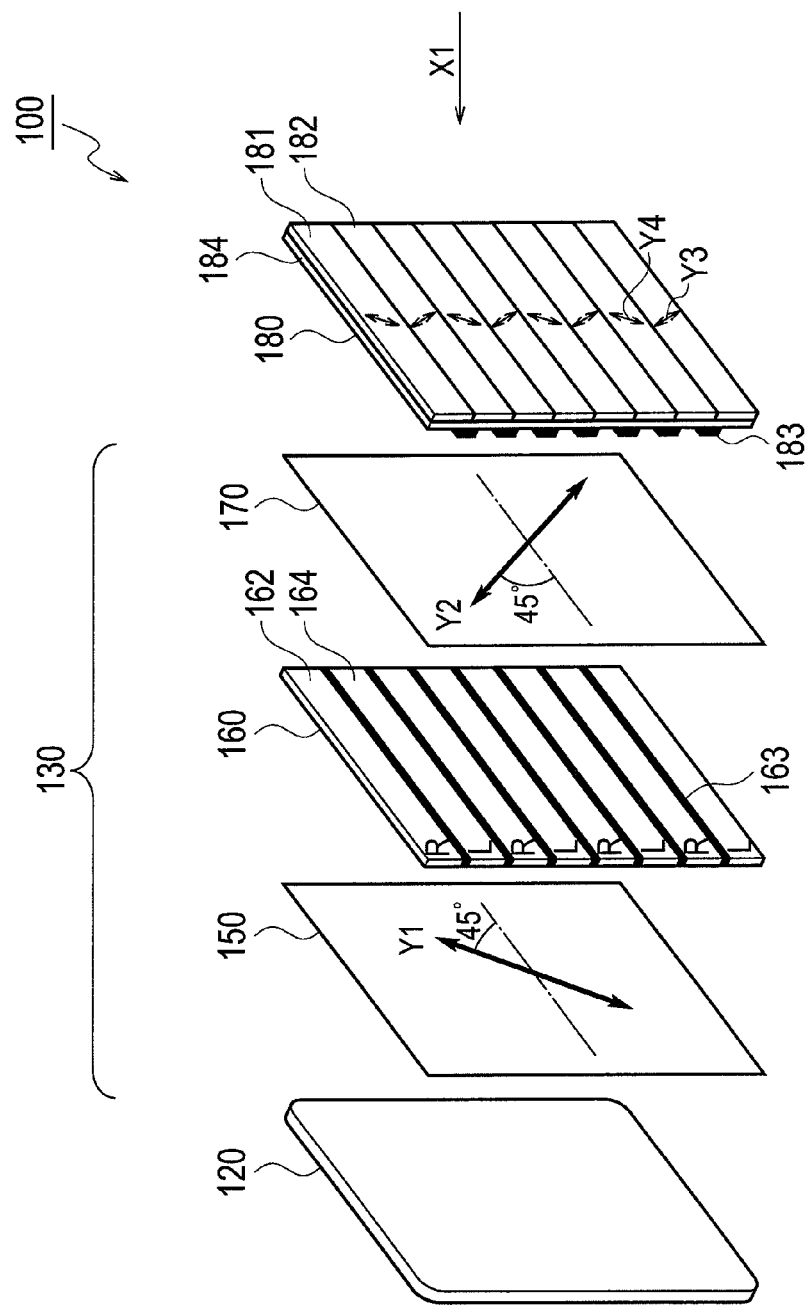
FIG. 1 is an exploded perspective view of a 3D image display device in accordance with an embodiment 1 of the present invention.

FIG. 1 is an exploded perspective view of a 3D image display device 100 of the embodiment 1.

The 3D image display device 100 includes a light source 120, an image display unit 130 and a polarizing-axis control plate (3D image display optical member) 180, in order illustrated in FIG. 1. They are accommodated in a not-shown casing. Again, the image display unit 130 includes a polarizing plate (linearly-polarized light generating unit) 150, an image generating unit 160 and a polarizing plate 170. Here, it is assumed that an observer observes a stereoscopic image displayed on the 3D image display device 100 from a direction of arrow X1 of FIG. 1 (from the right side of the polarizing-axis control plate 180).

The light source 120, which is arranged in the innermost side of the 3D image display device 100 when seen from the observer, is a reflection type polarizing plate provided to effectively utilize white unpolarized light or light from the light source transmits light under condition of using the 3D image display device 100 (referred to as "usage state of the 3D image display device 100" below). This polarizing plate transmits light identical to a direction for the polarizing plate 150 and also reflects the other light components for return. Then, the so-reflected light components are reflected in a backlight unit for emission, further polarized by the reflection type polarizing plate and emitted toward a surface of the polarizing plate 150. Although a surface illuminant is adopted as the light source 120 in the embodiment 1, it may be replaced with a combination of a point light source with a condenser lens instead. By way of example, a Fresnel lens sheet is available as the condenser lens.

The polarizing plate 150 is located on one side of the image generating unit 160, facing the light source 120. The polarizing plate 150 has a transmission axis and an absorption axis intersecting with the transmission axis at right angles. When unpolarized light emitted from the light source 120 enters, the polarizing plate transmits, of the unpolarized light, a light component having a polarizing axis parallel to the transmission axis and cuts off a light component having a polarizing axis parallel to the absorption axis. Here, the polarizing axis means a vibration direction of electrical field in the light. The transmission axis of the polarizing plate 150 is 45-degree inclined in the upper right or lower left to the horizontal direction on condition that an observer sees the 3D image display device 100, as shown with arrow Y1 of FIG. 1. Accordingly, the light emitted from the polarizing plate 150 becomes linearly-polarized light having an inclination of 45-degree to the horizontal direction.

The image generating unit 160 includes pixels corresponding to red light, green light and blue light, respectively. Further, the image generating unit 160 has right-eye image generating areas 162 each composed of a plurality of pixels and left-eye image generating areas 164 each composed of a plurality of different pixels from those of the right-eye image generating areas 162. The image generating unit 160, such as liquid crystal display elements, serves to optically modulate incident light on the basis of image signals inputted from the outside. The right-eye image generating areas 162 and the left-eye image generating areas 164 are areas obtained by segmentalizing the image generating unit 160 in the horizontal direction, as shown in FIG. 1. Multiple right-eye image generating areas 162 and multiple left-eye image generating areas 164 are arranged in the vertical direction, alternately.

In the usage state of the 3D image display device, an image for right eye and an image for left eye are generated in the right-eye image generating areas 162 and the left-eye image generating areas 164 of the image generating unit 160 respectively by a right-eye image signal and a left-eye image signal supplied from the outside. When part of light penetrating through the polarizing plate 150 enters the right-eye image generating areas 162 on condition that the right-eye image is being generated in the right-eye image generating areas 162, the incident light is optically modulated on the basis of the right-eye image signal, so that image light for a right-eye image (referred to as "right-eye image light" for short, below) is emitted from the right-eye image generating areas 162. In addition, when part of light penetrating through the polarizing plate 150 enters the left-eye image generating areas 164 on condition that the left-eye image is being generated in the left-eye image generating areas 164, the incident light is optically modulated on the basis of the left-eye image signals, so that image light for a left-eye image (referred to as "left-eye image light" for short, below) is emitted from the left-eye image generating areas 164. Regarding the right-eye image light emitted from the right-eye image generating areas 162 and the left-eye image light emitted from the left-eye image generating areas 164, respective polarizing axes are rotated in image light's areas optically-modulated based on the image signals. In addition, at the boundary parts of respective pixels of the image generating unit 160, shading parts called "black matrixes" are arranged to reduce color mixture among red light, green light and blue light. In addition, in the black matrix, image generating area shading parts 163 as band-like black stripes are formed at respective boundaries between the right-eye image generating areas 162 and the left-eye image generating areas 164, horizontally.

The polarizing plate 170 is located on one side of the image generating unit 160, facing the observer. When the right-eye image light penetrating through the above-mentioned right-eye image generating areas 162 and the left-eye image light penetrating through left-eye image generating areas 164 enter, this polarizing plate 170 transmits a polarization component of these light components, which has its polarizing axis parallel to the transmission axis, and also cuts off a polarization component having its pluralizing axis parallel to the absorption axis. Here, the transmission axis of the polarizing plate 170 is 45-degree inclined in the upper left and lower right directions to the horizontal direction on condition that the observer sees the 3D image display device 100, as shown with arrow Y2 of FIG. 1. Accordingly, the light emitted from the polarizing plate 170 becomes linearly-polarized light intersecting with the light emitted from the polarizing plate 150 at right angles and also having an inclination of 45-degree to the horizontal direction. In addition, by making the direction of the transmission axis of the polarizing plate 170 generally identical to the directions of the polarizing axes of the right-eye image light and the left-eye image light emitted from the image generating unit 160, it is possible to improve the brightness of the 3D image display device 100.

The polarizing-axis control plate 180 includes a substrate 184, first polarization areas 181 and second polarization areas 182 both formed on the substrate 184. In this polarizing-axis control plate 180, the positions and sizes of the first polarization areas 181 and the second polarization areas 182 correspond to the positions and sizes of the right-eye image generating areas 162 and the left-eye image generating areas 164 of the image generation part 160 respectively, as shown in FIG. 1. Therefore, in the usage state of the 3D image display device 100, the right-eye image light penetrating through the right-eye image generating areas 162 enters the first polarization areas 181, while the left-eye image light penetrating through the left-eye image generating areas 164 enters the second polarization areas 182.

The first polarization area 181 rotates the polarizing axis of the incident right-eye image light 90 degrees to a direction perpendicular to the polarizing axis of the left-eye image light incident on the second polarization area 182. On the other hand, the second polarization area 182 transmits the incident left-eye image light as it is without rotating its polarizing axis. Therefore, the polarizing axis of the right-eye image light penetrating through the first polarization area 181 and the polarizing axis of the left-eye image light penetrating through the second polarization area 182 directionally intersect with each other at right angles, as shown with arrows Y3, Y4 of FIG. 1. Note that, in FIG. 1, the arrows Y3, Y4 shown in the first polarization areas 181 and the second polarization areas 182 of the polarizing-axis control plate 180 represent respective directions of the polarizing axes of the polarized light passing through respective polarization areas.

For the substrate 184 of the polarizing-axis control plate 180, there is used a plate member made of e.g. low-birefringence transparent glass, low-birefringence resin, etc. or a film member having low birefringence so as not to change the direction of a polarizing axis of incident image light. For the first polarization area 181, there is used, for example, a half wavelength plate made from birefringent material, having a nature of rotating the direction of a polarizing axis of incident right-eye image light by 90-degrees. Further, for the second polarization area 182, there is adopted means of direct transmitting the light without anything on the substrate 184, for the purpose of allowing the incident left-eye image light to be transmitted as it is without changing the direction of its polarizing axis. Alternatively, there is used a member made of low-birefringence glass or resin or a polarizing plate having a similar polarization to the polarizing plate 170. As a result, the polarizing axis of the right-eye image light and the polarizing axis of the left-eye image light both emitted from the polarizing-axis control plate 180 directionally intersect with each other at right angles.

Further, the polarizing-axis control plate 180 is provided, on its surface facing the image display unit 130, with strip-shaped polarizing-axis control plate area shading parts 183 on the side of the plate 180 facing the image display unit 130, at each boundary between the first polarization areas 181 and the second polarization areas 182. By providing the polarizing-axis control plate area shading part 183 like this, it is possible to absorb and interrupt, of the left-eye image light to be entered into the second polarization area 182 adjacent to the first polarization area 181 of the polarizing-axis control plate 180, image light part entering the first polarization area 181 over the above boundary. Similarly, of the right-eye image light to be entered into the first polarization area 181 adjacent to the second polarization area 182 of the polarizing-axis control plate 180, it is possible to absorb and interrupt image light part entering the second polarization area 182 over the above boundary. Therefore, crosstalk becomes unlikely to be produced in the right-eye image light and the left-eye image light emitted from the 3D image display device 100. The details of this crosstalk will be described later.

Figure 2:
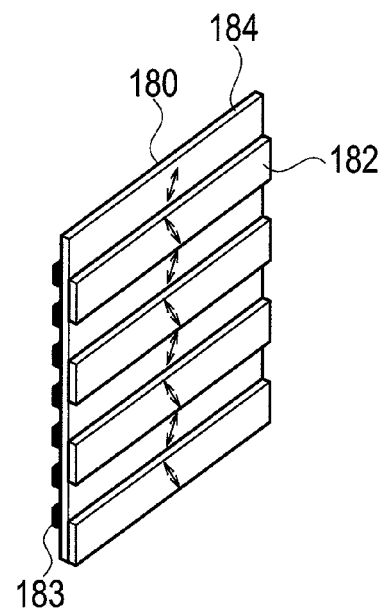
FIG. 2 is a perspective view showing another form of a polarizing-axis control plate of the 3D image display device of the embodiment 1 of the present invention.

In another form of the polarizing-axis control plate 180, as shown in FIG. 2, there may be adopted a structure including the substrate 184 and the second polarization areas 182 formed on the substrate 184.

In addition, the above 3D image display device 100 may include a diffusion plate that is arranged on one side of the polarizing-axis control plate 180 facing the observer (on the right side of the polarizing-axis control plate 180 in FIG. 1) to diffuse the right-eye image light and the left-eye image light penetrating through the first polarization areas 181 and the second polarization areas 182 to at least one, horizontal direction or vertical direction. For such a diffusion plate, there is used, for instance, either a lenticular lens sheet having a plurality of vault-shaped convex lenses (cylindrical lenses) stretched in the horizontal or vertical direction or a lens array sheet having a plurality of convex lenses arranged in a plane.

Figure 3:
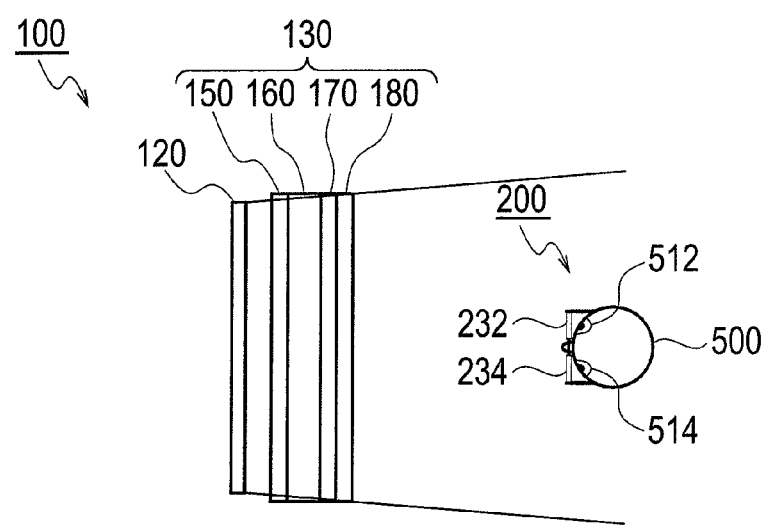
FIG. 3 is a schematic view showing the usage state of the 3D image display device of the embodiment 1 of the present invention.

FIG. 3 is a schematic view showing the usage state of the 3D image display device 100.

When viewing a stereoscopic image by the 3D image display device 100, an observer 500 views the right-eye image light and the left-eye image light projected from the 3D image display device 100 while putting on polarizing glasses 200. When the observer 500 puts on the polarizing glasses 200, a right-eye image transmission part 232 of the polarizing glasses 200 is located in a position corresponding to a right eye 512 of the observer 500, while a left-eye image transmission part 234 is located in a position corresponding to a left eye 514. The right-eye image transmission part 232 and the left-eye image transmission part 234 are polarizing lenses whose transmission axes are different in direction from each other and which are fixed on a frame of the polarizing glasses 200.

The right-eye image transmission part 232 is a polarizing plate whose transmission axis has the same orientation as the right-eye image light penetrating through the first polarization areas 181 and whose absorption axis has an orientation perpendicular to the above transmission axis. The left-eye image transmission part 234 is a polarizing plate whose transmission axis has the same orientation as the left-eye image light penetrating through the second polarization areas 182 and whose absorption axis has an orientation perpendicular to the above transmission axis. For the right-eye image transmission part 232 and left-eye image transmission part 234, there are used, for instance, polarizing glasses on which a polarization film obtained by uniaxial-drawing a film impregnated with dichroic dye is applied.

When viewing the stereoscopic image through the 3D image display device 100, the observer 500 observes the 3D image display device 100 while putting on the polarizing glasses 200 within the emitting range of the right-eye image light penetrating through the first polarization areas 181 and the left-eye image light penetrating through the second polarization areas 182. As a result, the observer can observe only a right-eye image contained in the right-eye image light left by an observer's right eye 512 and observe only a left-eye image contained in the left-eye image light left by an observer's left eye 514. Thus, the observer 500 can recognize the right-eye image and left-eye image in the form of a stereoscopic image.

Figure 4:
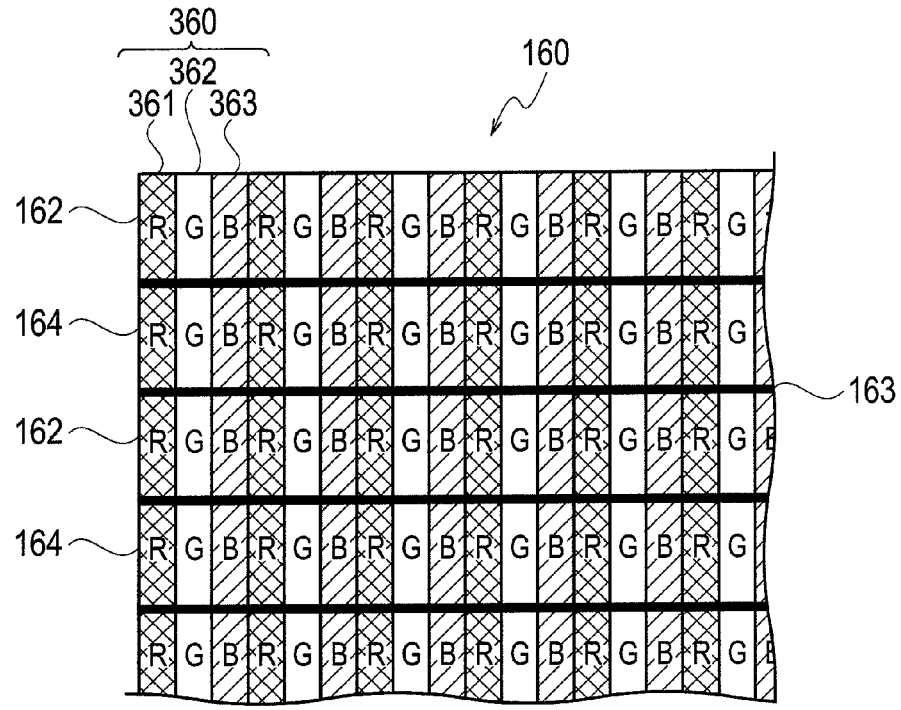
FIG. 4 is an enlarged plan view of a part of an image generating unit that the 3D image display device of the embodiment 1 of the present invention includes.

FIG. 4 is an enlarged plan view of a part of the image generating unit 160.

In the image generating unit 160, as shown in FIG. 4, the right-eye image generating area 162 and the left-eye image generating area 164 are respectively divided into a plurality of tiny cells in the horizontal direction. Each of these cells constitutes a pixel 360 as a minimum unit, to be optically modulated by an image signal applied from the outside. Each pixel 360 is provided with red, green and blue color filters indicative of three primary colors, providing a red indicating pixel 361, a green indicating pixel 362 and a blue indicating pixel 363, respectively.

Note that, in the right-eye image generating area 162 and the left-eye image generating area 164 of the image generating unit 160, for example, the red display pixel 361, the green display pixel 362 and the blue display pixel 363 are arranged in this order repeatedly, in the horizontal direction.

Moreover, as for the provision of black matrixes to prevent color mixture between the adjacent areas segmentalized by the color filters, the image generating area shading part 163 in the form of a black stripe as part of the black matrixes is formed at the boundary part of respective pixels including each boundary between the right-eye image generating area 162 and the left-eye image generating area 164 of the image generating unit 160.

The crosstalk will be described here.

Figure 5:
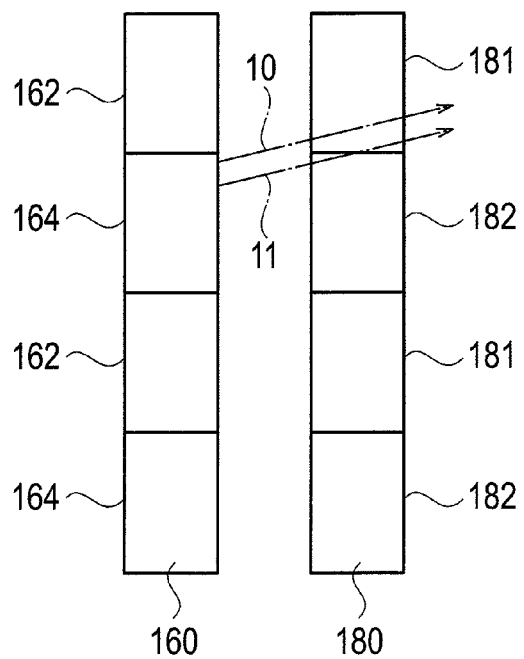
FIG. 5 is a sectional view illustrating an example of respective sections of the image generating unit and the polarizing-axis control plate under condition that neither an image generating area shading part nor a polarizing-axis control plate shading part is formed.

FIG. 5 is a sectional view illustrating one example of respective sections of the image generating unit 160 and the polarizing-axis control plate 180 in case that neither the image generating area shading part 163 nor the polarizing-axis control plate area shading part 183 is present.

In view from the observer 500, as shown in FIG. 5, the polarizing-axis control plate 180 is arranged in front of the image generating unit 160 so that the first polarization areas 181 are located ahead of the right-eye image generating areas 162 respectively, while the second polarization areas 182 are located ahead of the left-eye image generating areas 164 respectively.

The right-eye image light is emitted from the right-eye image generating area 162. Then, the emitted right-eye image light enters the first polarization area 181 where the vibrating direction of polarization is rotated 90-degrees and thereafter, the right-eye image light reaches the observer 500. On the other hand, the left-eye image light is emitted from the left-eye image generating area 164. Then, the emitted left-eye image light penetrates through the second polarization area 182 and reaches the observer 500.

Thus, in order to display a right-eye image and a left-eye image on the 3D image display device 100, it is required that the right-eye image light emitted from the right-eye image generating areas 162 enters the first polarization area 181, while the left-eye image light emitted from the left-eye image generating areas 164 enters the second polarization area 182.

For example, if the left-eye image light emitted from the left-eye image generating area 164 enters into the first polarization area 181, then the incident light turns to an image captured by the right-eye image transmission part 232 of the observer 500 since the vibrating direction of polarization is rotated 90-degrees. Of course, as this image is different from the original right-eye image, there is a possibility of causing a problem that the image captured by the observer 500 blurs and the stereoscopic effect becomes unclear, etc.

In the conventional art, however, it is very difficult to arrange the image generating unit 160 and the polarizing-axis control plate 180 with high accuracy so that the right-eye image light and the left-eye image light emitted from the image generating unit 160 can be all introduced into the first polarization areas 181 and the second polarization areas 182, respectively.

It is desirable that the right-eye image generating areas 162 and the left-eye image generating areas 164 are arranged densely (reduced in width) in order to obtain a clear image. In this case, however, it is very difficult to precisely position the first polarization areas 181 and the second polarization areas 182 so as to correspond to the right-eye image generating areas 162 and the left-eye image generating areas 164 respectively, ahead of the image generating unit 160 where the right-eye image generating areas 162 and the left-eye image generating areas 164 are arranged densely. Specifically, as the general first polarization areas 181 and the general second polarization areas 182 are microscopically linear-shaped with each width of approx. 200 μm, it is very difficult to precisely arrange them at the positioning level of "ten-odd μm", allowing a displacement of less than 5%.

Moreover, as both the right-eye image light emitted from the right-eye image generating areas 162 and the left-eye image light emitted from the left-eye image generating areas 164 are not parallel lights completely, there is a case that, for example, part of left-eye image light emitted from the vicinity of an upper end of the left-eye image generating area 164 shown in FIG. 5 enters the first polarization area 181 (arrow 10 shown in FIG. 5).

Furthermore, there is also a possibility that the left-eye image light emitted from the left-eye image generating area 164 once enters the second polarization area 182 and subsequently enters the first polarization area 181 (arrow 11 shown in FIG. 5). This phenomenon is generally called "crosstalk". In this case, the vibrating direction of polarization of the left-eye image light shown with arrow 11 will be rotated within the range of 0 to 90-degrees. For instance, if it is rotated 45-degrees, the left-eye image light will pass through the right-eye image transmission part 232 and the left-eye image transmission part 234, each with a light intensity of 50%. Also in this regard, there arises a problem that the image captured by the observer 500 blurs and the stereoscopic effect becomes unclear, etc.

Therefore, the 3D image display device 100 in accordance with the embodiment 1 includes the polarizing-axis control plate 180 equipped with the polarizing-axis control plate area shading parts 183.

Figure 6:
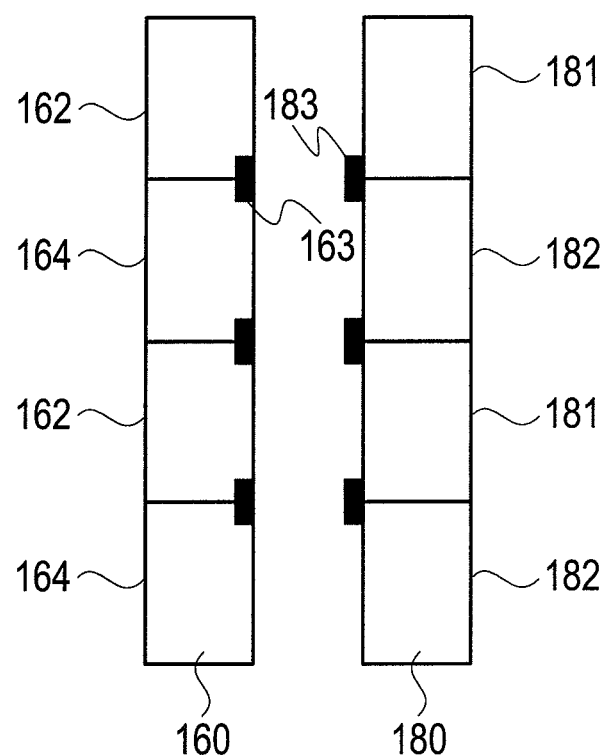
FIG. 6 is a sectional view illustrating an example of respective sections of the image generating unit and the polarizing-axis control plate that the 3D image display device of the embodiment 1 of the present invention includes.

FIG. 6 is a sectional view illustrating one example of respective sections of the image generating unit 160 and the polarizing-axis control plate 180 included in the 3D image display device 100 of the embodiment 1.

As shown in FIG. 6, in the image generating unit 160, the right-eye image generating areas 162 and the left-eye image generating areas 164 are juxtaposed to each other alternately. Further, the image generating area shading part 163 as a black stripe is formed at the boundary between the right-eye image generating area 162 and the left-eye image generating area 164 of the image generating unit 160.

Moreover, in the polarizing-axis control plate 180, the stripe-shaped polarizing-axis control plate area shading part 183 for reducing crosstalk is formed at the boundary between the second polarization area 182 and the first polarization area 181.

The image generating area shading parts 163 and the polarizing-axis control plate area shading parts 183 are formed by means of printing techniques, photolithographic method, etc. using ultraviolet curing resin or thermosetting resin with the addition of black dye. Normally, the polarizing-axis control plate area shading parts 183 are formed so as to be black stripes. Here, there are relief printing, lithography, intaglio printing, mimeograph printing, screen-stencil, offset printing, etc. available for the printing techniques.

Consequently, it is possible to absorb and interrupt, of the left-eye image light to be entered into the second polarization area 182 adjacent to the first polarization area 181, image light part entering the first polarization area 181 across the above boundary.

Similarly, it is possible to absorb and interrupt, of the right-eye image light to be entered into the first polarization area 181 adjacent to the second polarization area 182 of the polarizing-axis control plate 180, image light part entering the second polarization areas 182 across the above boundary. Therefore, crosstalk becomes unlikely to be produced in the right-eye image light and the left-eye image light emitted from the 3D image display device 100.

Therefore, when viewing the stereoscopic image through the 3D image display device 100, the observer 500 observes the 3D image display device 100 while putting on the polarizing glasses 200 within the emitting range of the right-eye image light penetrating through the first polarization areas 181 and the left-eye image light penetrating through the second polarization areas 182. As a result, the observer can observe only a right-eye image contained in the right-eye image light left by an observer's right eye and observe only a left-eye image contained in the left-eye image light left by an observer's left eye. Thus, the observer 500 can recognize these right-eye image and left-eye image in the form of a stereoscopic image.

However, as the pitch of the image generating area shading parts 163 approximates the pitch of the polarizing-axis control plate area shading parts 183, moiré is easy to be produced.

In the polarizing-axis control plate area shading part 183 of the polarizing-axis control plate 180 included in the 3D image display device 100 of the embodiment 1, therefore, a single black stripe is multi-segmentalized into a variety of linear patterns to reduce the occurrence of moiré. Here, as the linear patterns obtained by multi-segmentalizing the black stripe, there are straight lines multi-segmentalized in the vertical direction and aggregation of (rectangular, circular, oblong, polygonal) dots arranged at regular intervals in the horizontal direction.

In this way, as the linear pattern of the polarizing-axis control plate area shading part 183 is multi-segmentalized, the occurrence state of moiré also changes depending on the resulting multi-segmentalized profile.

<<Fundamental Experiments for Evaluating Influence of Linear-Pattern Profile on Moiré Occurrence>>

Thus, we carried out experiments for investigating the change of moiré and the change of light transmission rate by modifying the profile of the linear pattern, as shown below.

Figure 7:
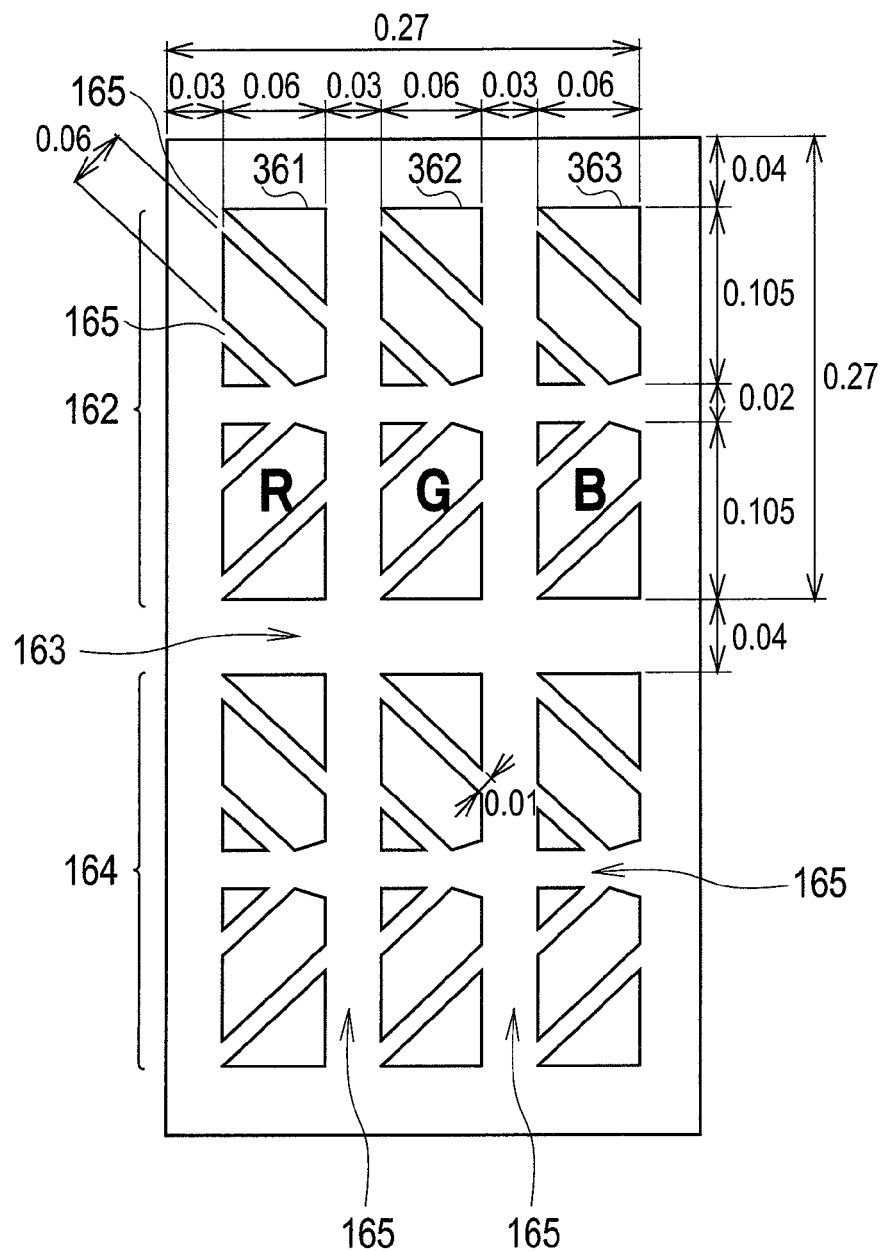
FIG. 7 is an enlarged view of the image generating unit used in an experiment for investigating a change of moiré in the 3D image display device of the embodiment 1 of the present invention.

In the 3D image display device 100 of the embodiment 1, FIG. 7 is an enlarged view of the image generating unit 160 used for the experiment for investigating the change of moiré and the change of light transmission rate. In addition, FIG. 7 shows one example of dimensions of the image generating unit 160 included in the 3D image display device 100 having a 24-inch screen.

As shown in FIG. 7, the right-eye image generating area 162 and the left-eye image generating area 164 of the image generating unit 160 are respectively divided into a plurality of tiny cells in the horizontal direction, so that each of these cells provides any of the red display pixel 361, the green display pixel 362 and the blue display pixel 363. Further, at respective boundaries among the red display pixel 361, the green display pixel 362, and the blue display pixel 363, interpixel shading parts 165 as the black stripes are formed to extend in the vertical direction.

As shown in FIG. 7, as respective horizontal widths of the red display pixel 361, the green display pixel 362 and the blue display pixel 363 are 0.06 (mm) each, the interval of the interpixel shading parts 165 adjoining in the horizontal direction is 0.03 (mm). Moreover, since respective vertical widths of the red display pixel 361, the green display pixel 362 and the blue display pixel 363 are 0.105 (mm) each, the interval of the interpixel shading parts 165 adjoining in the vertical direction is 0.02 (mm). In addition, the red display pixel 361, the green display pixel 362 and the blue display pixel 363 are respectively formed with the interpixel shading parts 165 as the black stripes extending in the oblique direction. As respective oblique widths of the red display pixel 361, the green display pixel 362 and the blue display pixel 363 is 0.06 (mm) each, the interval of the pixel shading parts 165 adjoining in the oblique direction is 0.01 (mm).

Moreover, as shown in FIG. 7, the image generating area shading part 163 formed at the boundary between the right-eye image generating area 162 and the left-eye image generating area 164 of the image generating unit 160 has a linewidth of 0.04 (mm).

Figure 8:
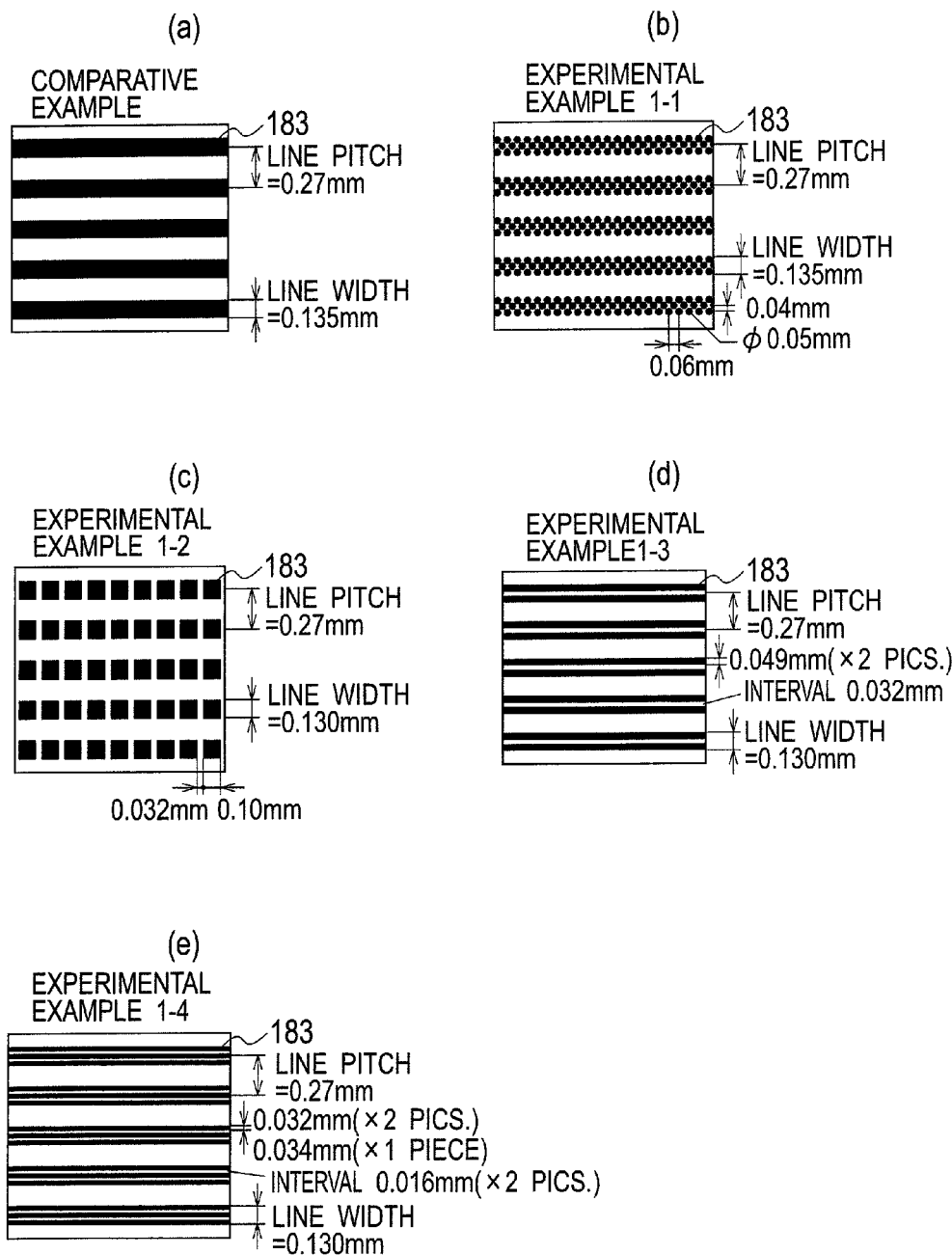
FIGS. 8(a) to 8(e) are views showing comparative and experimental examples of the linear patterns of polarizing-axis control plate shading parts in the 3D image display device of the embodiment 1 of the present invention.

FIGS. 8(*a*) to 8(*e*) are views showing comparative and experimental examples of linear pattern of the polarizing-axis control plate shading parts 183 in the 3D image display device 100 of the embodiment 1.

FIG. 8(*a*) shows the polarizing-axis control plate area shading parts constructed by the linear pattern where respective lines each having a width of 0.135 (mm) are arranged parallel to one another in the horizontal direction, at the pitch of 0.27 (mm), as the comparative example. In connection with the linear pattern where the lines each having a width of 0.135 (mm) are arranged parallel to one another in the horizontal direction at the pitch of 0.27 (mm), as the experimental example 1-1, FIG. 8(*b*) shows the polarizing-axis control plate area shading parts 183 where respective circles each having a diameter of 0.05 (mm) are arranged regularly in each line, obliquely and horizontally. Here, the horizontal pitch of circles is 0.06 (mm), while the vertical pitch is 0.04 (mm). In the linear pattern where lines each having a width of 0.130 (mm) are arranged parallel to one another in the horizontal direction at the pitch of 0.27 (mm), as the experimental example 1-2, FIG. 8(*c*) shows the polarizing-axis control plate area shading parts 183 where squares of 0.10 (mm) per side are arranged at regular intervals of 0.032 (mm) in each line, in the horizontal direction. In the linear pattern where lines each having a width of 0.130 (mm) are arranged parallel to one another in the horizontal direction at the pitch of 0.27 (mm), as the experimental example 1-3, FIG. 8(*d*) shows the polarizing-axis control plate area shading parts 183 where each line is composed of two straight lines each having a width of 0.049 (mm), extending in the horizontal direction. The interval between two straight lines is 0.032 (mm) In the linear pattern where lines each having a width of 0.130 (mm) are arranged parallel to one another in the horizontal direction at the pitch of 0.27 (mm), as the experimental example 1-4, FIG. 8(*e*) shows the polarizing-axis control plate area shading parts 183 where each line is composed of three lines in total: two straight lines each having a width of 0.032 (mm) and a single straight line having a width of 0.034 (mm) and interposed between the straight lines in pairs. Among the three lines, respective intervals between two adjoining straight lines are 0.016 (mm) each.

Figure 9:
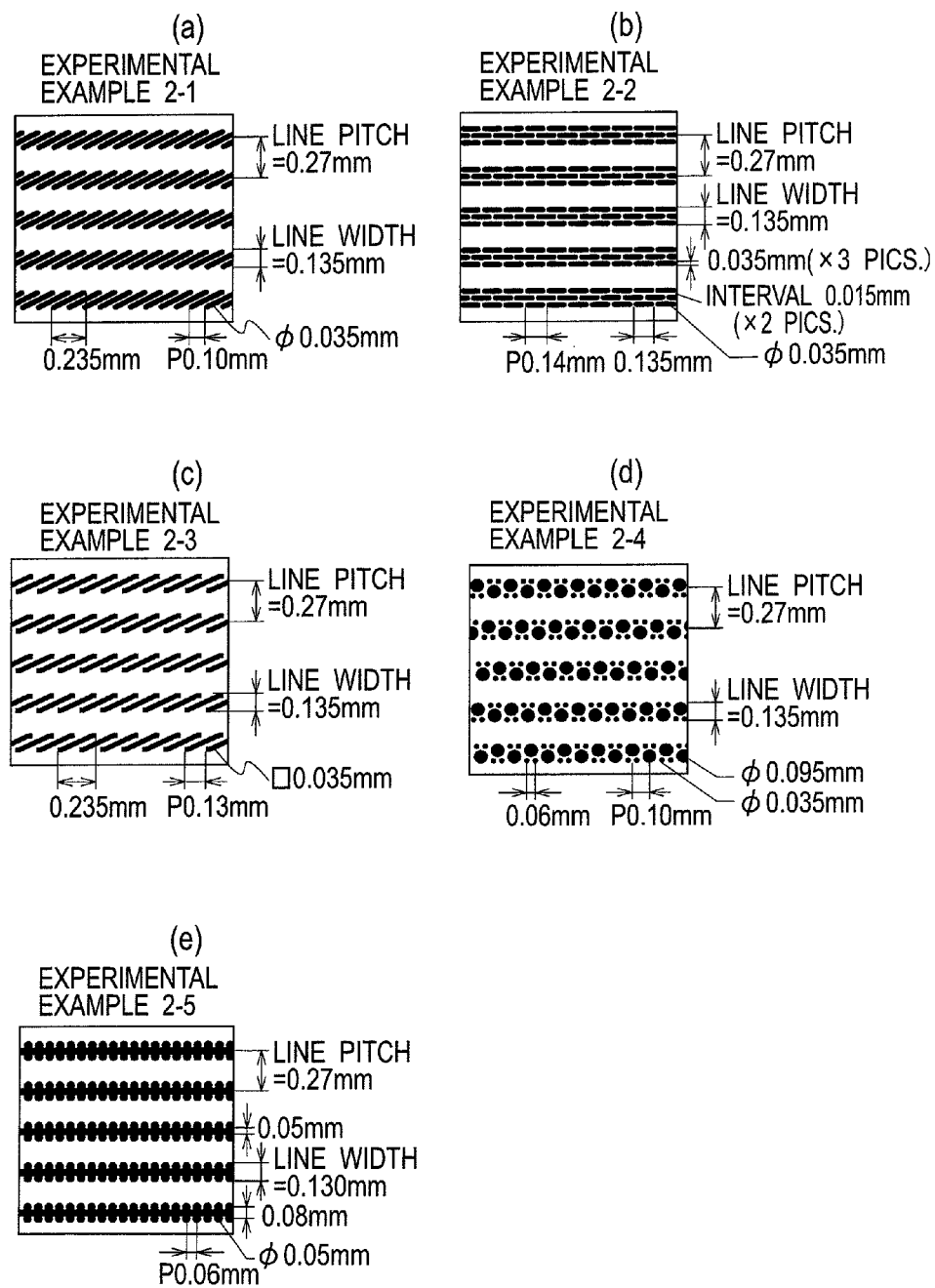
FIGS. 9(a) to 9(e) are views showing comparative and experimental examples of the linear patterns of the polarizing-axis control plate shading parts in the 3D image display device of the embodiment 1 of the present invention.

As similar to FIGS. 8(*a*) to 8(*e*), FIGS. 9(*a*) to 9(*e*) are views showing experimental examples of linear patterns of the polarizing-axis control plate shading parts 183 in the 3D image display device 100 of the embodiment 1.

As the experimental example 2-1, FIG. 9(*a*) shows the polarizing-axis control plate area shading parts 183 constructed by the linear pattern where respective lines each having a width of 0.135 (mm) are arranged parallel to one another in the horizontal direction at the pitch of 0.27 (mm), each line comprising elliptical oblique lines each having a width of 0.035 mm arranged regularly at the pitch of 0.10 (mm) in the horizontal direction. Here, each of the oblique lines has a projection length of 0.235 (mm) to the horizontal direction. As the experimental example 2-2, FIG. 9(*b*) shows the polarizing-axis control plate area shading parts 183 constructed by the linear pattern where respective lines each having a width of 0.135 (mm) are arranged parallel to one another in the horizontal direction at the pitch of 0.27 (mm), each line comprising elliptical lines each having a longitudinal length of 0.135 mm arranged regularly at the pitch of 0.14 (mm) in the horizontal direction. As the experimental example 2-3, FIG. 9(*c*) shows the polarizing-axis control plate area shading parts 183 constructed by the linear pattern where respective lines each having a width of 0.135 (mm) are arranged parallel to one another in the horizontal direction at the pitch of 0.27 (mm), each line comprising rectangular oblique lines of 0.035 (mm) per side arranged regularly at the pitch of 0.13 (mm) in the horizontal direction. Here, each of the elliptical lines has a projection length of 0.235 (mm) to the horizontal direction. As the experimental example 2-4, FIG. 9(d) shows the polarizing-axis control plate area shading parts 183 constructed by the linear pattern where respective lines each having a width of 0.135 (mm) are arranged parallel to one another in the horizontal direction at the pitch of 0.27 (mm), each line comprising respective pairs of three circles: one great circle having a diameter of 0.095 (mm) and two small circles each having a diameter of 0.035 (mm), the respective pairs of circles being arranged regularly at the pitch of 0.10 (mm) so that the adjoining pairs are oppositely-arranged in the vertical direction alternately. Here, the horizontal interval between two small circles is 0.06 (mm). As the experimental example 2-5, FIG. 9(e) shows the polarizing-axis control plate area shading parts 183 constructed by the linear pattern where respective lines each having a width of 0.130 (mm) are arranged parallel to one another in the horizontal direction at the pitch of 0.27 (mm), each line comprising respective graphic symbols arranged regularly at the pitch of 0.06 (mm) in the horizontal direction. Each graphic symbol is formed by an integration of a single line having a width of 0.05 (mm) with circles each having a diameter of 0.05 (mm) on both sides of the single line in the vertical direction, the single line and the circles being arranged so as to partially overlap each other along the single line. Here, in each graphic symbol, the center-to-center distance between two circles is 0.08 (mm).

For the 3D image display device 100 of the embodiment 1, FIG. 10 is a diagram showing the results of evaluating moire and light transmission rates for the experimental examples shown in FIGS. 8(a) to 8(e) and FIGS. 9(a) to 9(e). Suppose that the evaluated values of moire range are from 0 to 5. Also suppose that, on condition of viewing moire at the front, oblique and vertical observing positions, the smaller the evaluated value gets, the more the moire is difficult to be observed, and the larger the evaluated value gets, the more the moire becomes clear as well. It is assumed that the evaluated values of moire in front and oblique positions are "5" in the arrangement where the polarizing-axis control plate area shading part 183 is formed by a single straight line at one boundary, namely, in the comparative example. On this assumption, we evaluated respective moires viewed from the front, oblique and vertical positions in each experiment and further calculated a sum of evaluated values of moire on evaluation.

Moreover, the light transmission rates were obtained by measuring respective transparent plates with the polarizing-axis control plate area shading parts 183 with the use of a total-light flux transmittance meter (HR-100 made by Murakami Color Research Laboratory Co. Ltd.), and the artificial judgment was performed based on the sum of evaluated values of moire and the light transmission rate. On condition that the light transmission rate exceeds 45 (%), concretely, if the sum of evaluated values of moire is more than or equal to 0 and less than or equal to 3, the artificial judgment was represented by "⊚". If the sum of evaluated values of moire exceeds 3 and is less than or equal to 5, the artificial judgment was represented by "○". If the sum of evaluated values of moire exceeds 5 and less than or equal to 7, the artificial judgment was represented by "Δ". If the sum of evaluated values of moire exceeds 7 and less than or equal to 10, the artificial judgment was represented by "x". If the sum of evaluated values of moire exceeds 10, the artificial judgment was represented by "xx".

As shown in FIG. 10, as the sums of evaluated values of moiré in the experimental examples 1-1, 1-4 and 2-1 represent small values of "4", "3.5" and "5" respectively while the sum of evaluated values of moiré in the comparative example is "10", it can be said that these experimental examples have a constant effect of reducing the occurrence of moiré. In addition, since the light transmission rates in the experimental examples 1-1, 1-4 and 2-1 represent large values of "58", "56" and "57" respectively in comparison with the light transmission rate of "45" (%) in the comparative example, it is found that the screens are increased in brightness in comparison with the comparative example.

Furthermore, as the sum total of evaluated values of moiré in the experimental example 2-5 represents a remarkably small value of "3" in comparison with "10" in the comparative example and the light transmission rate represents a large value of "55", it can be said that the experimental example 2-5 enables the screen to be increased in brightness in comparison with the comparative example and has a greater effect of reducing the occurrence of moiré.

In this way, according to the 3D image display device 100 of the embodiment 1, since the optical random nature is produced by changing the linear pattern profiles of the polarizing-axis control plate area shading parts 183 to reduce an interference between the image generating area shading parts 163 and the interpixel shading parts 165, it is possible to improve the light transmission rate and reduce the occurrence of moiré.

<<Experiments for Evaluating Influence of Circle Diameter and Line Width on Moiré Occurrence>>

Next, we carried out experiments for investigating the change of moiré and the change of light transmission rate by changing the diameters of circles and the widths of lines included in the polarizing-axis control plate area shading parts 183, as shown below.

FIGS. 11(a) to 11(e) are views showing experimental examples of linear patterns of the polarizing-axis control plate shading parts 183 in the 3D image display device 100 of the embodiment 1.

As the experimental example 3-2, FIG. 11(a) shows the polarizing-axis control plate area shading parts 183 constructed by the linear pattern where respective lines each having a width of 0.160 (mm) are arranged parallel to one another in the horizontal direction at the pitch of 0.27 (mm), each line comprising respective circles each having a diameter of 0.06 (mm) arranged regularly in the oblique and horizontal directions. Here, the horizontal pitch of circles is 0.08 (mm), while the vertical pitch is 0.05 (mm). As the experimental example 3-3, FIG. 11(b) shows the polarizing-axis control plate area shading parts 183 constructed by the linear pattern where respective lines each having a width of 0.190 (mm) are arranged parallel to one another in the horizontal direction at the pitch of 0.27 (mm), each line comprising respective circles each having a diameter of 0.07 (mm) arranged regularly in the oblique and horizontal directions. Here, the horizontal pitch of circles is 0.09 (mm), while the vertical pitch is 0.06 (mm). As the experimental example 4-3, FIG. 11(c) shows the polarizing-axis control plate area shading parts 183 constructed by the linear pattern where lines having a width of 0.130 (mm) are arranged parallel to one another in the horizontal direction at the pitch of 0.27 (mm), each line comprising three straight lines each having a width of 0.03 (mm), extending in the horizontal direction. Here, in these three straight lines, the intervals between two lines are 0.02 (mm) respectively. As the experimental example 4-4, FIG. 11(d) shows the polarizing-axis control plate area shading parts 183 constructed by the linear pattern where lines having a width of 0.138 (mm) are arranged parallel to one another in the horizontal direction at the pitch of 0.27 (mm), each line comprising five straight lines each having a width of 0.018 (mm), extending in the horizontal direction. Here, in these five straight lines, all of intervals between two adjoining lines are 0.012 (mm) respectively. As the experimental example 4-5, FIG. 11(e) shows the polarizing-axis control plate area shading parts 183 constructed by the linear pattern where lines having a width of 0.133 (mm) are arranged parallel to one another in the horizontal direction at the pitch of 0.27 (mm), each line comprising seven straight lines each having a width of 0.013 (mm), extending in the horizontal direction. Here, in these seven straight lines, all of intervals between two adjoining lines are 0.007 (mm) respectively.

Figure 11:
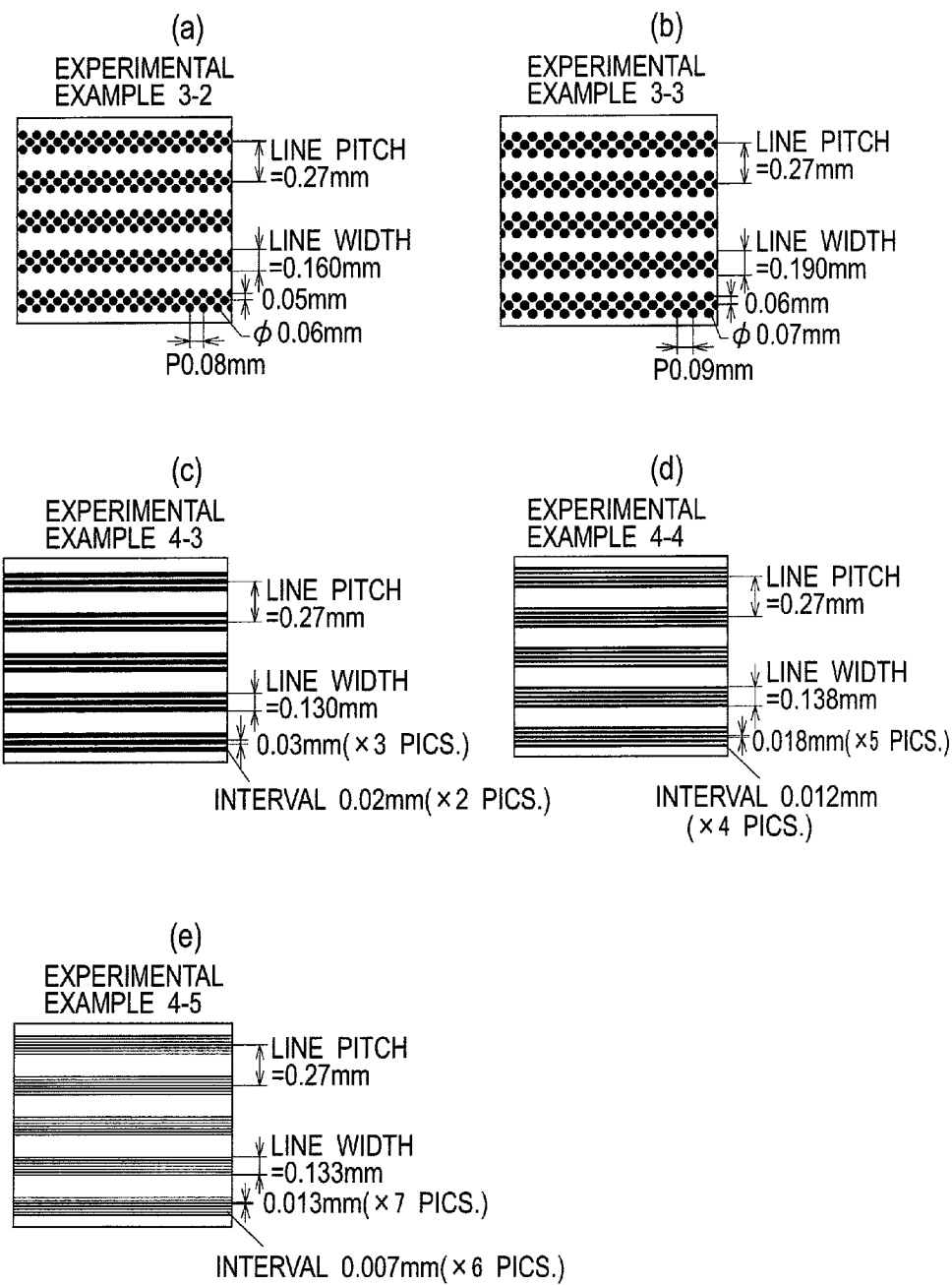
FIGS. 11(a) to 11(e) are views showing experimental examples of linear patterns of the polarizing-axis control plate shading parts in the 3D image display device of the embodiment 1 of the present invention.

In the 3D image display device 100 of the embodiment 1, FIG. 12 is a diagram showing the results of evaluating moiré and light transmission rates about the comparative example shown in FIG. 8(a) and the experimental examples shown in FIG. 11. Note that the evaluated values of moiré and the light transmission rates are similar to the evaluated values of moiré and the light transmission rates shown in FIG. 10, respectively.

As shown in FIG. 12, as the sums of evaluated values of moiré in the experimental examples 1-1, 3-2 and 3-3 represent small values of "4", "7" and "8" respectively while the sum of evaluated values of moiré in the comparative example is "10", it can be said that these experimental examples have a constant effect of reducing the occurrence of moiré. In addition, since the light transmission rates in the experimental examples 1-1, 3-2 and 3-3 represent large values of "58", "57" and "49" respectively in comparison with the light transmission rate of "45" (%) in the comparative example, the screens are increased in brightness in comparison with the comparative example. In this way, the smaller the diameter of a circle gets, the higher the value of synthetic judgment is elevated. Especially, it is more advantageous that the sum of evaluated values of moiré is sufficiently lowered and the light transmission rate is sufficiently elevated so as to be sustainable for practical use in the experimental example 1-1 adopting the arrangement of successive circles each having a diameter less than 0.06 (mm), which is smaller than either of the interval between the adjoining image generating area shading parts 163 and the interval between the adjoining interpixel shading parts 165.

Note that, while the evaluated values of oblique moiré in the experimental examples 1-1, 3-2 and 3-3 are "2", "3" and "4" respectively, the evaluated value of oblique moiré in the experimental example 2-5 represents a remarkably-small value of "1". For the reason, it is considered that a single straight line having a width of 0.05 (mm) interferes the continuity of circles in the oblique direction to enhance the optical random nature, so that the interference between the image generating area shading parts 163 and the interpixel shading parts 165 is reduced.

As mentioned above, since the polarizing-axis control plate area shading part 183 of the 3D image display device 100 of the embodiment 1 is formed so as to contain a plurality of circles each having a diameter smaller than either of the interval between the adjoining image generating area shading parts 163 and the interval between the adjoining interpixel shading parts 165, it is possible to improve the light transmission rate and reduce the occurrence of moiré.

Again, as shown in FIG. 12, since the sums of evaluated values of moiré in the experimental examples 1-3, 1-4, 4-3, 4-4 and 4-5 represent small values of "8", "3.5", "4", "3" and "2" respectively while the sum of evaluated values of moiré in the comparative example is "10", it can be said that these experimental examples have a constant effect of reducing the occurrence of moiré in common. In addition, since the light transmission rates in the experimental examples 1-3, 1-4, 4-3, 4-4 and 4-5 represent large values of "56", "57", "52" and "47" respectively in comparison with the light transmission rate of "45" (%) in the comparative example, the screens are commonly increased in brightness in comparison with the comparative example. In this way, the smaller the linewidth of a straight line gets, the higher the value of synthetic judgment is elevated. Especially, it is more advantageous that the sums of evaluated values of moiré are sufficiently lowered and the light transmission rates are sufficiently elevated so as to be sustainable for practical use in common with the experimental examples 1-3, 1-4, 4-3, 4-4 and 4-5 where each linewidth is less than 0.04 (mm) as the linewidth of the adjoining image generating area shading part 163.

As mentioned above, since the polarizing-axis control plate area shading part 183 of the 3D image display device 100 of the embodiment 1 is formed so as to contain a plurality of straight lines each having a linewidth smaller than the linewidth of the image generating area shading part 163, it is possible to improve the light transmission rate and reduce the occurrence of moiré.

<<Additional Experiments for Evaluating Influence of Linear Pattern on Moiré Occurrence>>

Next, we carried out experiments for investigating the change of moiré and the change of light transmission rate by modifying the polarizing-axis control plate area shading parts 183 to various configurations, as shown below.

FIGS. 13(a) to (c) are views showing experimental examples of linear patterns of the polarizing-axis control plate shading parts 183 in the 3D image display device 100 of the embodiment 1.

As the experimental example 5-2, FIG. 13(a) shows the polarizing-axis control plate area shading parts 183 constructed by the linear pattern where respective lines each having a width of 0.135 (mm) are arranged parallel to one another in the horizontal direction at the pitch of 0.27 (mm), each line comprising successive graphic symbols arranged regularly at the pitch of 0.05 (mm) in the horizontal direction, each graphic symbols comprising a single line having a width of 0.05 (mm) and circles arranged on both sides of the single line in the vertical direction and each having a diameter of 0.035 (mm). As the experimental example 5-4, FIG. 13(b) shows the polarizing-axis control plate area shading parts 183 constructed by the linear pattern where respective lines each having a width of 0.130 (mm) are arranged parallel to one another in the horizontal direction at the pitch of 0.27 (mm), each line comprising successive rectangular holes, 0.03 (mm) on a side each, arranged regularly at the pitch of 0.06 (mm) in the horizontal direction. As the experimental example 5-6, FIG. 13(c) shows the polarizing-axis control plate area shading parts 183 constructed by the linear pattern where respective lines each having a width of 0.140 (mm) are arranged parallel to one another in the horizontal direction at the pitch of 0.27 (mm), each line comprising successive rectangular holes arranged at random, 0.035 (mm) on a side each. Here, the random arrangement means that the rectangular holes are outlined on the black background, at the rate of 25% per unit area.

Figure 13:
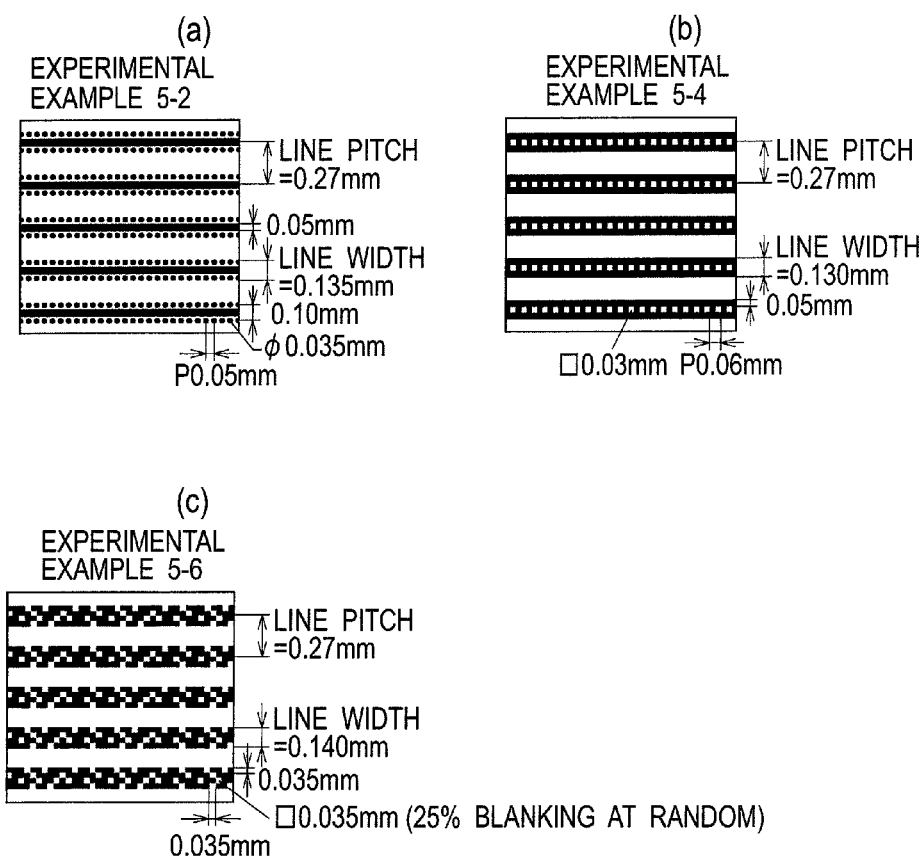
FIGS. 13(a) to 13(c) are views showing experimental examples of the linear patterns of the polarizing-axis control plate shading parts in the 3D image display device of the embodiment 1 of the present invention.

In the 3D image display device 100 of the embodiment 1, FIG. 14 is a diagram showing the results of evaluating moiré and light transmission rates about the comparative example shown in FIG. 8(a) and the experimental examples shown in FIG. 13. Note that the evaluated values of moiré and the light transmission rates are similar to the evaluated values of moiré and the light transmission rates shown in FIG. 10, respectively.

As shown in FIG. 14, as the sums of evaluated values of moiré in the experimental examples 5-4 and 5-6 represent similar or larger values of "10" and "12" respectively while the sum of evaluated values of moiré in the comparative example is "10", it can be said that these experimental examples have no effect of reducing the occurrence of moiré. For the reason, it is considered that the boundaries between the polarizing-axis control plate area shading parts 183 are in the form of straight lines.

On the other hand, the sum of evaluated values of moiré in the experimental example 5-2 represents a remarkably-small value of "2.5", allowing the occurrence of moiré to be further reduced in comparison with the experimental example 2-5. In addition, due to its smallness in the diameter of each circle, the light transmission rate represents a large value of "63", so that the brightness of the screen is further increased in comparison with the experimental example 2-5.

As mentioned above, since the polarizing-axis control plate area shading part 183 of the 3D image display device 100 of the embodiment 1 is formed so as to contain at least one straight line having a width smaller than either of the interval between the adjoining image generating area shading parts 163 and the interval between the adjoining interpixel shading parts 165 and a plurality of circles arranged along the straight line on the boundary's side and each formed with a diameter smaller than either of the interval between the adjoining image generating area shading parts 163 and the interval between the adjoining interpixel shading parts 165, the optical random nature is produced to reduce interferences with the image generating area shading parts 163 and the interpixel shading parts 165. Thus, it is possible to improve the light transmission rate and reduce the occurrence of moiré.

<<Additional Experiments for Evaluating Influence of Rectangle Position on Moiré Occurrence>>

Next, we carried out experiments for investigating the change of moiré and the change of light transmission rate by changing the positions of rectangles contained in the polarizing-axis control plate area shading parts 183, as shown below.

FIGS. 15(*a*) to 15(*e*) are views showing experimental examples of the linear patterns of the polarizing-axis control plate shading parts 183 in the 3D image display device 100 of the embodiment 1.

As the experimental example 6-1, FIG. 15(*a*) shows the polarizing-axis control plate area shading parts 183 constructed by the linear pattern where respective lines each having a width of 0.135 (mm) are arranged parallel to one another in the horizontal direction at the pitch of 0.27 (mm), each line comprising successive rectangles arranged in respective lines regularly in the vertical and horizontal directions, the rectangle being 0.1 (mm) on each horizontal side and 0.135 (mm) on each vertical side. Here, the interval between the adjoining rectangles is 0.05 (mm). As the experimental example 6-2, FIG. 15(*b*) shows the polarizing-axis control plate area shading parts 183 constructed by the linear pattern where respective lines each having a width of 0.135 (mm) are arranged parallel to one another in the horizontal direction at the pitch of 0.27 (mm), each rectangle in each line being shifted from a vertically-adjoining rectangle by only 0.015 (mm) in the horizontal direction, the rectangle being 0.1 (mm) on each horizontal side and 0.135 (mm) on each vertical side. Here, the interval between the adjoining rectangles is 0.05 (mm). As the experimental example 6-3, FIG. 15(*c*) shows the polarizing-axis control plate area shading parts 183 constructed by the linear pattern where respective lines each having a width of 0.135 (mm) are arranged parallel to one another in the horizontal direction at the pitch of 0.27 (mm), each rectangle in each line being shifted from a vertically-adjoining rectangle by only 0.03 (mm) in the horizontal direction, the rectangle being 0.1 (mm) on each horizontal side and 0.135 (mm) on each vertical side. Here, the interval between the adjoining rectangles is 0.05 (mm). As the experimental example 6-4, FIG. 15(*d*) shows the polarizing-axis control plate area shading parts 183 constructed by the linear pattern where respective lines each having a width of 0.135 (mm) are arranged parallel to one another in the horizontal direction at the pitch of 0.27 (mm), each rectangle in each line being shifted from a vertically-adjoining rectangle by only 0.05 (mm) in the horizontal direction, the rectangle being 0.1 (mm) on each horizontal side and 0.135 (mm) on each vertical side. Here, the interval between the adjoining rectangles is 0.05 (mm). As the experimental example 6-5, FIG. 15(*e*) shows the polarizing-axis control plate area shading parts 183 constructed by the linear pattern where respective lines each having a width of 0.135 (mm) are arranged parallel to one another in the horizontal direction at the pitch of 0.27 (mm), each rectangle in each line being shifted from a vertically-adjoining rectangle by only 0.075 (mm) in the horizontal direction, the rectangle being 0.1 (mm) on each horizontal side and 0.135 (mm) on each vertical side. Here, the interval between the adjoining rectangles is 0.05 (mm).

In the 3D image display device 100 of the embodiment 1, FIG. 16 is a diagram showing the results of evaluating moiré and light transmission rates about the comparative example shown in FIG. 8(*a*) and the experimental examples shown in FIG. 15. Note that the evaluated values of moiré and the light transmission rates are similar to the evaluated values of moiré and the light transmission rates shown in FIG. 10, respectively.

As shown in FIG. 16, as the sums of evaluated values of moiré in the experimental examples 6-1 and 6-2 represent the same values of "10" and "12" respectively while the sum of evaluated values of moiré in the comparative example is "10", it can be said that these experimental examples have no effect of reducing the occurrence of moiré.

On the other hand, as the sums of evaluated values of moiré in the experimental examples 6-3, 6-4 and 6-5 represent small values of "8", "4" and "4" in comparison with "10" in the sum of evaluated values of moiré in the comparative example, it can be said that these experimental examples have a constant effect of reducing the occurrence of moiré. In addition, since the light transmission rates in the experimental examples 6-3, 6-4 and 6-5 represent large values of "60", "60" and "58" respectively in comparison with the light transmission rate of "45" (%) in the comparative example, the screens are increased in brightness in comparison with the comparative example.

In this way, the larger the shifting amount of each rectangle in the horizontal direction gets, the higher the value of synthetic judgment is elevated. In the experimental examples 6-4 and 6-5 where each rectangle is shifted from the vertically-adjoined rectangle in the horizontally direction by only ⅓ to ½ of the horizontal pitch of rectangles, especially, it is more advantageous that the sum of evaluated values of moiré is sufficiently lowered and the light transmission rate is sufficiently elevated so as to be sustainable for practical use.

Note that there is concern that when the optical transmission rate gets higher, the crosstalk ratio is elevated.

Therefore, we performed experiments of investigating the linear patterns of the polarizing-axis control plate area shading parts 183 and the changes of crosstalk ratio.

In the 3D image display device 100 of the embodiment 1, FIG. 17 is a diagram showing the results of crosstalk ratios with respect to each view angle about the comparative example shown in FIG. 8(*a*), the experimental example 1-1 shown in FIG. 8(*b*) and the experimental example 5-2 shown in FIG. 13(*a*).

As shown in FIG. 17, in the experimental examples 1-1 and 5-2 whose optical transmission ratios are respectively "58" (%) and "63" (%) against the comparative example having the optical transmission ratio of "45" (%), their crosstalk ratios represent similar values. Thus, it is considered that there is no deterioration in images by the geometric change of the polarizing-axis control plate area shading parts 183.

As mentioned above, according to the 3D image display device of the embodiment 1, it is possible to improve the light transmission rate and reduce the occurrence of moiré.

Figure 18:
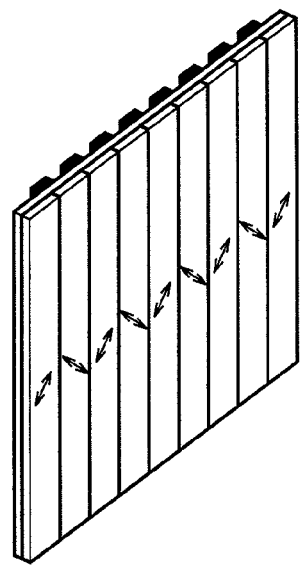
FIG. 18 is a perspective view showing another embodiment of the polarizing-axis control plate in the 3D image display device of the embodiment 1 of the present invention.

In addition, as shown in FIG. 1, although the embodiment 1 has been described while providing the illustration of both the right-eye image generating areas 162 and the left-eye image generating areas 164 in the form of horizontally-segmentalized areas in the image generating unit 160, they may be comprised of vertically-segmentalized areas in the image generating unit 160, as shown in FIG. 18. Then, it is necessary to modify the drive circuit for the image generating unit 160 and also change the compartmental direction between the first polarization areas 181 and the second polarization areas 182 to a vertical direction.

Figure 19:
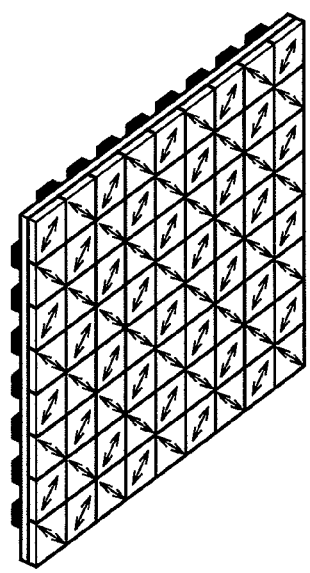
FIG. 19 is a perspective view showing the other embodiment of the polarizing-axis control plate in the 3D image display device of the embodiment 1 of the present invention.
Figure 20:
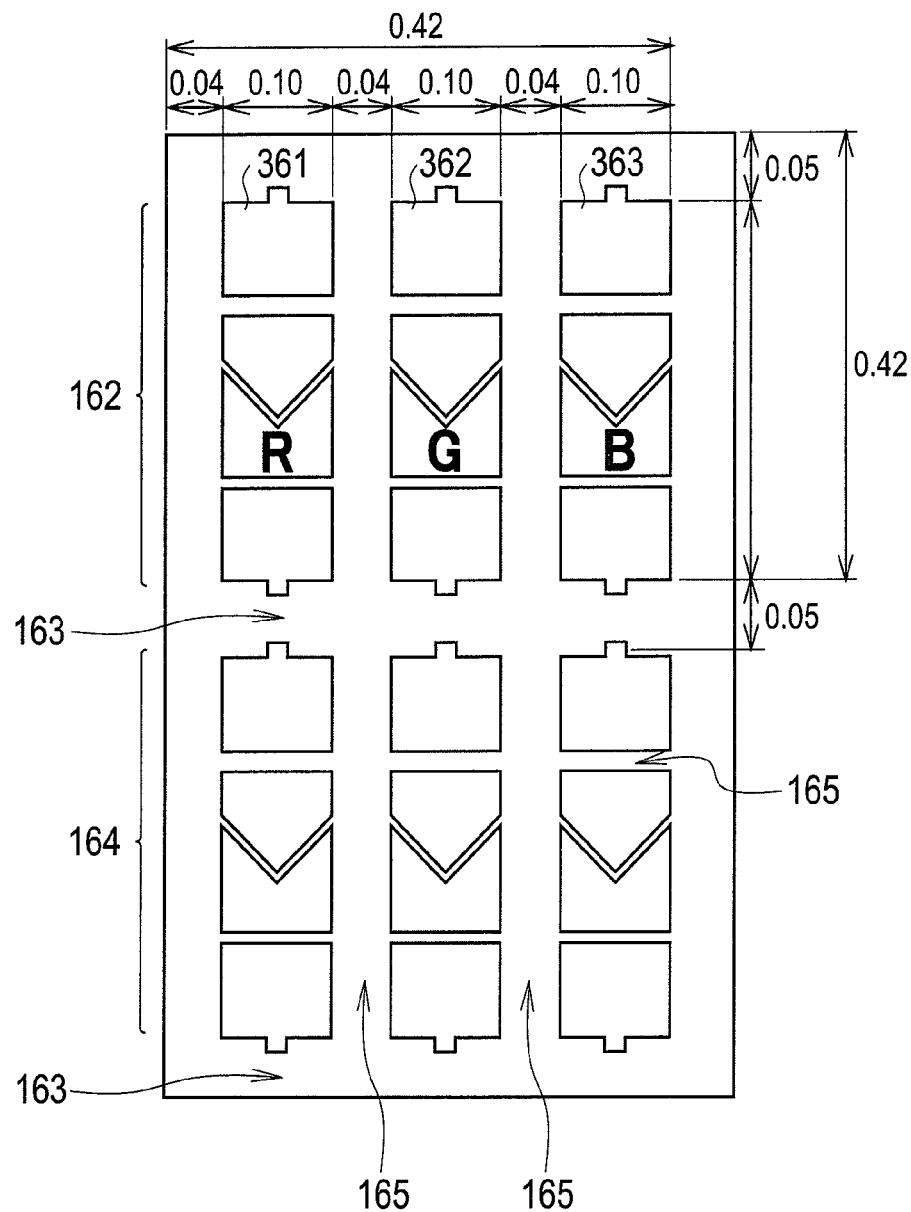
FIG. 20 is an enlarged plan view of a part of an image generating unit of another embodiment that the 3D image display device of the embodiment 1 of the present invention includes.

Moreover, with the modification of the drive circuit for the image generating unit 160, the right-eye image generating areas 162 and the left-eye image generating areas 164 of the image generating unit 160 may be formed in a lattice manner by compartmentalizing the unit 160 vertically and horizontally, as shown in FIG. 19. In this case, the polarizing-axis control plate 180 has to be formed in a lattice manner, corresponding to the image generating unit 160.

Again, although the embodiment 1 has been illustrated by an example of the 3D image display device 100 having a 24-inche screen, the screen size of the invention is not limited to only this size. For instance, also in the 3D image display device 100 having a 37-inch screen, it is possible to improve the optical transmission ratio and reduce the occurrence of moiré similarly.

<Embodiment 2>

In the embodiment 1, the invention has been described by an example of the 3D image display device 100 where when right-eye image light and left-eye image light enter the first polarization areas 181 and the second polarization areas 182 respectively, the polarizing-axis control plate 180 emits the incident right-eye image light and the incident left-eye image light in the form of linearly-polarized lights having polarizing axes at right angles to each other. However, the present invention is not limited to only this device.

The embodiment 2 will be described by an example of a 3D image display device 101 where when right-eye image light and left-eye image light enter the first polarization areas 181 and the second polarization areas 182 respectively, a polarizing-axis control plate emits the incident right-eye image light and the incident left-eye image light in the form of circularly-polarized lights whose polarizing axes are rotated in opposite directions to each other.

Figure 21:
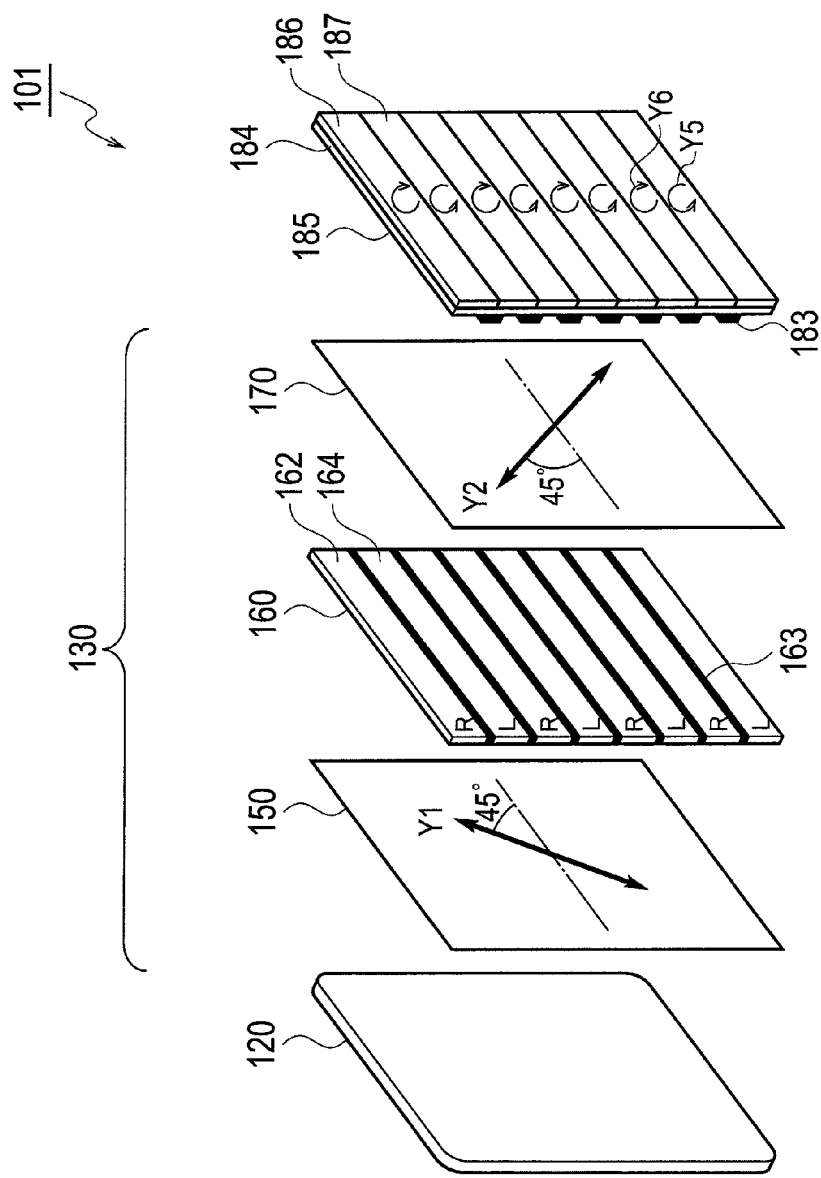
FIG. 21 is an exploded perspective view of a 3D image display device in accordance with an embodiment 2 of the present invention.

FIG. 21 is an exploded perspective view of the 3D image display device 101 of the embodiment 2.

In the 3D image display device 101 shown in FIG. 21, elements identical to those of the 3D image display device 100 shown in FIG. 1 are indicated with the same reference numerals, respectively and their descriptions are eliminated.

As shown in FIG. 21, the 3D image display device 101 includes a polarizing-axis control plate 185 in place of the polarizing-axis control plate 180 of the 3D image display device 100. This polarizing-axis control plate 185 includes a substrate 184 and first polarization areas 186 and second polarization areas 187 both formed on the substrate 185. In this polarizing-axis control plate 185, the position and size of the first polarization areas 186 and the second polarization areas 187 correspond to the position and size of the right-eye image generating areas 162 and the left-eye image generating areas 164 of the image generation part 160 respectively, as similar to the position and size of the first polarization areas 181 and the second polarization areas 182 of the above polarizing-axis control plate 180. Therefore, in the usage state of the 3D image display device 101, the right-eye image light penetrating through the right-eye image generating areas 162 enters the first polarization areas 186, while the left-eye image light penetrating through the left-eye image generating areas 164 enters the second polarization areas 187.

The first polarization area 186 emits the incident right-eye image light in the form of right-handed circularly-polarized light. While, the second polarization areas 187 emits the incident left-eye image light in the form of left-handed circularly-polarized light. Note that, in FIG. 21, arrows Y5, Y6 of the polarizing-axis control plate 185 designate respective rotating directions of the polarized lights penetrating through this polarizing-axis control plate 185. For the first polarization areas 186, there are used, for example, quarter wavelength plates having optical axes extending in the horizontal direction. For the second polarization areas 187, there are used, for example, quarter wavelength plates having optical axes extending in the vertical direction. In the polarizing-axis control plate 185, the first polarization area 186 and the second polarization area 187 are respectively divided into a plurality of tiny cells in the horizontal direction, similarly to the first polarization area 181 and the second polarization area 187 of the above polarizing-axis control plate 180.

When viewing the 3D image display device 101 equipped with the polarizing-axis control plate 185, the observer 500 puts on polarizing glasses having quarter wavelength plates and polarizing lenses arranged in respective positions corresponding to the right eye 512 and the left eye 514 respectively. In the polarizing glasses, the quarter wavelength plate arranged in the position corresponding to the right eye 512 of the observer 500 has an optical axis extending in horizontal direction, while the quarter wavelength plate arranged in the position corresponding to the left eye 514 of the observer 500 has an optical axis extending in vertical direction.

In addition, the polarizing lens arranged in the position corresponding to the right eye 512 of the observer 500 and the polarizing lens arranged in the position corresponding to the left eye 514 of the observer 500 have their transmission axes extending 45-degrees oblique right together when viewed from the observer 500 and their absorption axes intersecting with the transmission axes at right angles. Further, the polarizing axis of the polarizing lens arranged in the position corresponding to the right eye 512 is perpendicular to the polarizing axis of the polarizing lens arranged in the position corresponding to the right eye 514.

Under the condition that the observer 500 observes the 3D image display device 101 with the above polarizing glasses, when circularly-polarized light whose polarizing axis is rotated right-handed in a view from the observer 500 enters the polarizing glass corresponding to the right eye 512 of the observer 500, the circularly-polarized light is converted to linearly-polarized light of 45-degrees oblique right by the above quarter wavelength plate having its optical axis extending in the horizontal direction and thereafter, the resultant polarized light penetrates through the above polarizing lens into the right eye 512 of the observer 500.

Further, when circularly-polarized light whose polarizing axis is rotated left-handed in a view from the observer 500 enters the polarizing glass corresponding to the left eye 514 of the observer 500, the circularly-polarized light is converted to linearly-polarized light of 45-degrees oblique right by the above quarter wavelength plate having its optical axis extending in the vertical direction and thereafter, the resultant polarized light penetrates through the above polarizing lens into the left eye 514 of the observer 500.

In this way, by observing the 3D image display device 100 with the above polarizing glasses, the observer can observe only a right-eye image contained in the right-eye image light left by the observer's right eye 512 and observe only a left-eye image contained in the left-eye image light left by the observer's left eye 514. Thus, the observer 500 can recognize these right-eye image and left-eye image in the form of a stereoscopic image.

According to the 3D image display device 101 of the embodiment 2 as well as the 3D image display device 100 of the embodiment 1, since it includes the first polarization areas 181, the second polarization areas 182 and the polarizing-axis control plate area shading parts 183 each arranged at the boundary between the first polarization area 181 and the second polarization area 182, respective areas of different optical transmission ratios appear at random, so that moiré between the image generating area shading parts 163 and the interpixel shading parts 165 is reduced in contrast between moirés' black portions and white portions, allowing the occurrence of moiré to be reduced.

<Embodiment 3>

Although the 3D image display device 100 of the embodiment 1 is constructed so that the first polarization area 181 and the second polarization area 182 of the polarizing-axis control plate 180 coincide with the right-eye image generating area 162 and the left-eye image generating area 164 of the image generation part 160 in terms of their positions and sizes, the invention is not limited to only this arrangement.

The embodiment 3 will be described by an example of a 3D image display device 102 where the polarizing-axis control plate 180 is arranged so that the positions and sizes of the first polarization area 181 and the second polarization areas 182 correspond to the positions and sizes of the right-eye image generating area 162 and the left-eye image generating area 164 of the image generation part 160, depending on a distance from the device up to the position of an observer.

Figure 22:
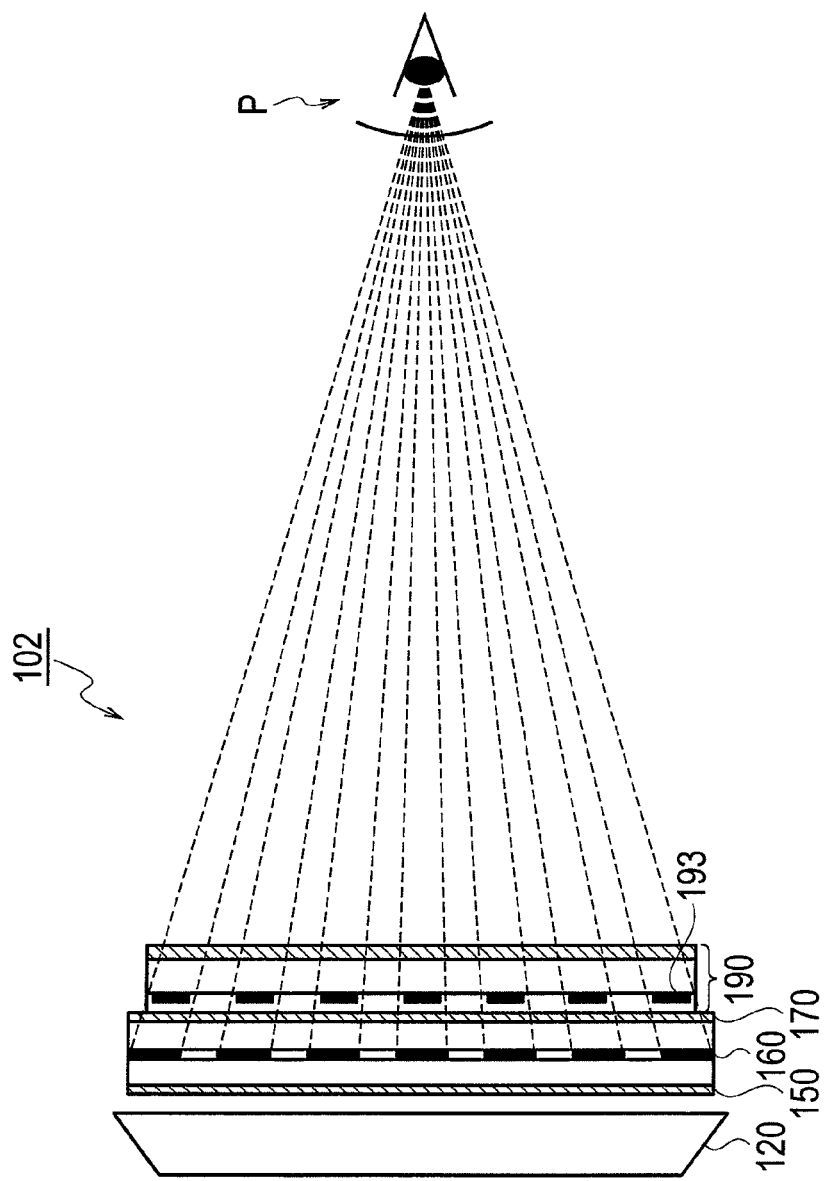
FIG. 22 is a constitutional view showing the constitution of a 3D image display device in accordance with an embodiment 3 of the present invention.

FIG. 22 is a constitutional view showing the constitution of the 3D image display device 102 of the embodiment 3. Note that, in the 3D image display device 102 shown in of the embodiment 3, elements identical to those of the 3D image display device 100 of FIG. 1 are indicated with the same reference numerals respectively, and their descriptions are eliminated in what follows.

As shown in FIG. 22, the 3D image display device 102 includes a polarizing-axis control plate 190 in place of the polarizing-axis control plate 180 of the 3D image display device 100.

The polarizing-axis control plate 190 includes the substrate 184 (not shown), first polarization areas 191 and second polarization areas 192 both formed on the substrate 185 (both not shown) and polarizing-axis control plate area shading parts 193 each arranged at the boundary between the first polarization area 191 and the second polarization area 192.

Here, the polarizing-axis control plate area shading part 193 has the same constitution as the polarizing-axis control plate area shading part 183 included in the 3D image display device 100 of the embodiment 1.

In the polarizing-axis control plate 190, based on a distance from an observer's position P envisaged from the screen size of the 3D image display device 100 up to the image generating unit 160 and a distance from the observer's position P up to the polarizing-axis control plate 190, the first polarization areas 191, the second polarization areas 192 and the polarizing-axis control plate area shading parts 193 of the polarizing-axis control plate 190 are arranged so that the image generating area shading parts 163 and the polarizing-axis control plate area shading parts 193 overlap each other in a view from the observer.

In this way, according to the 3D image display device 102 of the embodiment 3, when the observer performs an observation at the position P, the image generating area shading parts and the polarizing-axis control plate area shading parts appear to overlap each other. However, if the observer performs the observation in a position closer to or further from the 3D image display device 102 than the position P, the image generating area shading parts and the polarizing-axis control plate area shading parts will appear to be shifted from each other.

According to the 3D image display device 102 of the embodiment 3, it includes the first polarization areas 181, the second polarization areas 182 and the polarizing-axis control plate area shading parts 183 each arranged at the boundary between the first polarization area 181 and the second polarization area 182, as similar to the 3D image display device 100 of the embodiment 1. Thus, even when such an observer observes it in a position other than the position P, respective areas of different optical transmission ratios appear at random, so that moiré between the image generating area shading parts 163 and the interpixel shading parts 165 is reduced in contrast between moirés' black portions and white portions, allowing the occurrence of moiré to be reduced.

Note that, without being limited to the above-mentioned printing technique, the polarizing-axis control plate area shading parts 183, 193 may be formed by a variety of techniques, such as photolithography method.

In the meantime, as for the multifraction forming of the linear pattern of the polarizing-axis control plate area shading part 183 with use of the above-mentioned printing technique, if the multifractionated profiles approach each other or the viscosity of ink in use is low, there is a possibility that the approaching profiles are connected to each other. For instance, there may be a case of connection between lines situated next to each other, between dots (rectangular, circular, elliptical, polygonal) lying next to each other or between a line and a dot (rectangular, circular, elliptical, polygonal) lying next to each other.

FIGS. 23 illustrate one example of ink flow when adopting the segmentation pattern of the experimental example 1-1. FIG. 23(A) is an enlarged view of dots of FIG. 8(b), showing the design status. FIG. 23(B) is an enlarged view of dots formed under the condition of FIG. 23(A) actually.

As shown in FIG. 23(B), in case of printing with the use of the linear pattern of the experimental example 1-1 shown in FIG. 23(A), the dots are connected with each other, so that spaces centrally located in a dot row are occupied by ink.

When the adjoining profiles are connected to each other in this way, the polarizing-axis control plate area shading part 183 is not printed uniformly since the connected part resulting from the ink flow has a film thickness smaller than that of a dot part. Accordingly, the optical random nature of transmissive light is maintained to bring about a similar effect.

INDUSTRIAL APPLICABILITY

As mentioned above, according to the present invention, it is possible to reduce the occurrence of moiré.

REFERENCE SIGNS LIST 100, 101, 201 3D Image Display Device
120 Light Source
130 Image Display Unit
150 Polarizing Plate
160 Image Generating Unit
162 Right-eye Image Generating Area
163 Image Generating Area Shading Part
164 Left-eye Image Generating Area
170 Polarizing Plate
180, 185, 190 Polarizing-axis Control Plate
181, 186, 191 First Polarization Area
182, 187, 192 Second Polarization Area
183, 193 Polarizing-axis Control Plate Area Shading Part
200 Polarizing Glasses

What is claimed is:

1. A 3D image display optical member comprising:
an image generating unit having a first modulated-light generating area to optically modulate linearly-polarized light having a first polarizing axis with a predetermined angle based on a first image signal thereby generating first modulation-polarization light for emission and a second modulated-light generating area to optically modulate the linearly-polarized light having the first polarizing axis based on a second image signal thereby generating second modulation-polarization light for emission;
a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and
a polarizing-axis control plate having a first polarization area arranged corresponding to the position of the first modulated-light generating area in the image generating unit to polarize a polarizing axis of the first modulation-polarization light, which has been emitted from the polarizing plate and entered the first polarization area, to a third polarizing axis thereby generating a third modulation-polarization light for emission, a second polarization area arranged corresponding to the position of the second modulated-light generating area in the image generating unit to polarize a polarizing axis of the second modulation-polarization light, which has been emitted from the polarizing plate and entered the second polarization area, to a fourth polarizing axis thereby generating a fourth modulation-polarization light for emission, and a shading part arranged at a boundary between the first polarization area and the second polarization area to shade incident light,
wherein the image generating unit has an image generating area shading part arranged at a boundary between the first modulated-light generating area and the second modulated-light generating area to shade incident light, and
the shading part is formed so as to contain a plurality of straight lines each having a width smaller than a linewidth of the image generating area shading part.

2. A 3D image display device comprising:
a light source;
a linearly-polarized light generating unit configured to transmit, of light emitted from the light source, first linearly-polarized light having the first polarizing axis; and
a 3D image display optical member of claim 1,
wherein an image generated by the third modulation-polarization light emitted from the first polarization area of the polarizing-axis control plate is established as a right-eye image, while an image generated by the fourth modulation-polarization light emitted from the second polarization area is established as a left-eye image.

3. A 3D image display optical member comprising:
an image generating unit having first modulated-light generating areas to optically modulate linearly-polarized light having a first polarizing axis with a predetermined angle based on a first image signal thereby generating first modulation-polarization light for emission and second modulated-light generating areas to optically modulate the linearly-polarized light having the first polarizing axis based on a second image signal thereby generating second modulation-polarization light for emission;
a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and
a polarizing-axis control plate having first polarization areas arranged corresponding to the positions of the first modulated-light generating areas in the image generating unit to polarize a polarizing axis of the first modulation-polarization light, which has been emitted from the polarizing plate and entered the first polarization areas, to a third polarizing axis thereby generating a third modulation-polarization light for emission, second polarization areas arranged corresponding to the position of the second modulated-light generating area in the image generating unit to polarize a polarizing axis of the second modulation-polarization light, which has been emitted from the polarizing plate and entered the second polarization areas, to a fourth polarizing axis thereby generating a fourth modulation-polarization light for emission, and shading parts each arranged at a boundary between the first polarization area and the second polarization area to shade incident light,
wherein the image generating unit has image generating area shading parts each arranged at a boundary between the first modulated-light generating area and the second modulated-light generating area to shade incident light and interpixel shading parts each arranged at a boundary between pixels provided in each of the first modulated-light generating areas and the second modulated-light generating areas to shade incident light,
the shading part is formed so as to contain at least one straight line having a width smaller than an interval between the adjoining image generating area shading parts or an interval between the adjoining interpixel shading parts and a plurality of circles arranged on the side of the boundary along the straight line, the circles each having a diameter smaller than either the interval between the adjoining image generating area shading parts or the interval between the adjoining interpixel shading parts.

4. A 3D image display optical member comprising:
- an image generating unit having first modulated-light generating areas to optically modulate linearly-polarized light having a first polarizing axis with a predetermined angle based on a first image signal thereby generating first modulation-polarization light for emission and second modulated-light generating areas to optically modulate the linearly-polarized light having the first polarizing axis based on a second image signal thereby generating second modulation-polarization light for emission;
- a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and
- a polarizing-axis control plate having first polarization areas arranged corresponding to the positions of the first modulated-light generating areas in the image generating unit to polarize a polarizing axis of the first modulation-polarization light, which has been emitted from the polarizing plate and entered the first polarization areas, to a third polarizing axis thereby generating a third modulation-polarization light for emission, second polarization areas arranged corresponding to the position of the second modulated-light generating area in the image generating unit to polarize a polarizing axis of the second modulation-polarization light, which has been emitted from the polarizing plate and entered the second polarization areas, to a fourth polarizing axis thereby generating a fourth modulation-polarization light for emission, and shading parts each arranged at a boundary between the first polarization area and the second polarization area to shade incident light,
- wherein the image generating unit has image generating area shading parts each arranged at a boundary between the first modulated-light generating area and the second modulated-light generating area to shade incident light and interpixel shading parts each arranged at a boundary between pixels provided in each of the first modulated-light generating areas and the second modulated-light generating areas to shade incident light,
- the shading part is formed so as to contain a plurality of circles each having a diameter smaller than an interval between the adjoining image generating area shading parts or an interval between the adjoining interpixel shading parts.

5. A 3D image display optical member comprising:
- an image generating unit having first modulated-light generating areas to optically modulate linearly-polarized light having a first polarizing axis with a predetermined angle based on a first image signal thereby generating first modulation-polarization light for emission and second modulated-light generating areas to optically modulate the linearly-polarized light having the first polarizing axis based on a second image signal thereby generating second modulation-polarization light for emission;
- a polarizing plate configured to transmit and emit, of the first modulation-polarization light and the second modulation-polarization light emitted from the image generating unit, the first modulation-polarization light and the second modulation-polarization light as linearly-polarized light having a second polarizing axis different from the first polarizing axis; and
- a polarizing-axis control plate having first polarization areas arranged corresponding to the positions of the first modulated-light generating areas in the image generating unit to polarize a polarizing axis of the first modulation-polarization light, which has been emitted from the polarizing plate and entered the first polarization areas, to a third polarizing axis thereby generating a third modulation-polarization light for emission, second polarization areas arranged corresponding to the positions of the second modulated-light generating areas in the image generating unit to polarize a polarizing axis of the second modulation-polarization light, which has been emitted from the polarizing plate and entered the second polarization areas, to a fourth polarizing axis thereby generating a fourth modulation-polarization light for emission, and shading parts each arranged at a boundary between the first polarization area and the second polarization area to shade incident light,
- wherein the image generating unit has image generating area shading parts each arranged at a boundary between the first modulated-light generating area and the second modulated-light generating area to shade incident light and interpixel shading parts each arranged at a boundary between pixels provided in each of the first modulated-light generating areas and the second modulated-light generating areas to shade incident light,
- the shading part includes a plurality of rectangles arranged along the boundary between the first polarization area and the second polarization area and also arranged so as to be shifted from rectangles in the shading part provided at the adjoining boundary, in the arranging direction of the rectangles by only $1/3$ to $1/2$ of a horizontal pitch at which the rectangles provided at the adjoining boundary are arranged.

* * * * *